(12) United States Patent
Okura et al.

(10) Patent No.: US 11,556,706 B2
(45) Date of Patent: Jan. 17, 2023

(54) EFFECTIVE RETRIEVAL OF TEXT DATA BASED ON SEMANTIC ATTRIBUTES BETWEEN MORPHEMES

(71) Applicant: FUJITSU LIMITED, Kawasaki (JP)

(72) Inventors: Seiji Okura, Meguro (JP); Masahiro Kataoka, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 680 days.

(21) Appl. No.: 16/423,333

(22) Filed: May 28, 2019

(65) Prior Publication Data

US 2019/0370328 A1    Dec. 5, 2019

(30) Foreign Application Priority Data

Jun. 4, 2018   (JP) .............................. JP2018-106940

(51) Int. Cl.
  *G06F 17/00*   (2019.01)
  *G06F 40/268*  (2020.01)
  *G06F 40/30*   (2020.01)

(52) U.S. Cl.
  CPC ............ *G06F 40/268* (2020.01); *G06F 40/30* (2020.01)

(58) Field of Classification Search
  None
  See application file for complete search history.

(56) References Cited

U.S. PATENT DOCUMENTS

| | | | |
|---|---|---|---|
| 7,092,870 B1* | 8/2006 | Chen ..................... | G06F 40/284 704/9 |
| 7,376,642 B2* | 5/2008 | Nayak ................... | G06F 16/338 |
| 8,352,463 B2* | 1/2013 | Nayak ..................... | G06F 16/31 707/723 |
| 9,645,993 B2* | 5/2017 | Zuev ........................ | G06F 40/58 |
| 10,629,186 B1* | 4/2020 | Slifka .................... | G06F 40/295 |
| 2015/0278198 A1* | 10/2015 | Andreev ............... | G06F 40/268 704/9 |
| 2016/0004766 A1* | 1/2016 | Danielyan ............... | G06F 40/30 707/723 |
| 2017/0161255 A1* | 6/2017 | Starostin ............... | G06F 40/211 |
| 2018/0060306 A1* | 3/2018 | Starostin ................ | G06F 40/30 |
| 2019/0042568 A1* | 2/2019 | Balabine ............... | G06F 40/205 |
| 2019/0163746 A1* | 5/2019 | Meisner ................ | G06F 40/268 |
| 2019/0222602 A1* | 7/2019 | Linder .............. | G06F 16/24578 |

FOREIGN PATENT DOCUMENTS

| | | |
|---|---|---|
| JP | 11-203312 | 7/1999 |
| JP | 2000-322449 | 11/2000 |
| JP | 2004-046438 | 2/2004 |
| JP | 2010-538375 | 12/2010 |
| WO | 2009/029905 A2 | 3/2009 |

OTHER PUBLICATIONS

JPOA—Office Action of Japanese Patent Application No. 2018-106940 dated Feb. 1, 2022 with Machine Translation.

* cited by examiner

*Primary Examiner* — Satwant K Singh
(74) *Attorney, Agent, or Firm* — Fujitsu Patent Center

(57) ABSTRACT

An apparatus generates an index including positions of morphemes included in a target text data and semantic attributes between the morphemes corresponding to the positions. The apparatus gives information including positions of morphemes included in an input query and semantic attributes between the morphemes corresponding to the positions to the query, and executes a retrieval on the target text data, based on the information given to the query and the index.

15 Claims, 33 Drawing Sheets

FIG. 2

| TEXT ID | TEXT DATA |
|---|---|
| T101 | 今から示すのは、これまでに様々な研究機関により評価が進められた統計を使った機械翻訳に関する論文です… |
| T102 | …自然言語処理…… |
| T103 | …言語処理…… |
| T104 | …処理言語…… |
| T105 | …統計を使わない人間翻訳…… |
| ⋮ | ⋮ |

| TEXT ID | INDEX |
|---------|-------|
| T101 | INDEX GENERATED FROM TEXT DATA PIECE WITH TEXT ID "T101" |
| T102 | INDEX GENERATED FROM TEXT DATA PIECE WITH TEXT ID "T102" |
| T103 | INDEX GENERATED FROM TEXT DATA PIECE WITH TEXT ID "T103" |
| T104 | INDEX GENERATED FROM TEXT DATA PIECE WITH TEXT ID "T104" |
| T105 | INDEX GENERATED FROM TEXT DATA PIECE WITH TEXT ID "T105" |
| ... | ... |

| | | | EXAMPLE 1 |
|---|---|---|---|
| DATABASE | 自然言語処理(ONE WORD) | 統計的機械翻訳(ONE WORD) | |
| QUERY | 自然言語(ONE WORD) | 統計的 翻訳(TWO WORDS) | |
| | 言語(ONE WORD) | 統計的 翻訳(TWO WORDS) | |
| | 言語処理(ONE WORD) | 統計 機械翻訳(TWO WORDS) | |

| | | | EXAMPLE 2 |
|---|---|---|---|
| DATABASE | 自然言語の処理 | 統計を使った機械翻訳 | |
| QUERY | 言語処理 | 統計を利用した機械翻訳 | |
| | 自然言語処理 | 統計による翻訳 | |

EFFECTIVE RETRIEVAL OF TEXT DATA BASED ON SEMANTIC ATTRIBUTES BETWEEN MORPHEMES

CROSS-REFERENCE TO RELATED APPLICATION

This application is based upon and claims the benefit of priority of the prior Japanese Patent Application No. 2018-106940, filed on Jun. 4, 2018, the entire contents of which are incorporated herein by reference.

FIELD

The embodiments discussed herein are related to effective retrieval of text data based on semantic attributes between morphemes.

BACKGROUND

In recent years, an explosively increased amount of data of text has been stored in databases, and the importance of retrievals has been increased. A certain character string may be designated in a query to retrieve text. However, if there are many variations of an expression that the character string to be retrieved means, retrieval omissions may occur or irrelevant text may be retrieved.

In the following description, in a case where queries and text data pieces are Japanese, Japanese characters are used on an "as is" basis and the meaning thereof is added in parenthesis immediately after the Japanese characters as needed for the sake of convenience.

FIG. 30 is a diagram for explaining the existing condition of retrievals. As illustrated in Example 1, although "自然言語" (natural language) (one word)", "言語" (language) (one word), and "言語処理" (language processing) (one word) are character strings (such as composite words) having the same meaning as "自然言語処理" (natural language processing) (one word), they do not match in words. Therefore, even though "自然言語" (natural language), "言語" (language), or "言語処理" (language processing) is designated in a query and a retrieval in words is performed, "自然言語処理" (natural language processing) in a database does not hit. Also, "統計 翻訳" (statistics translation) (two words), "統計的 翻訳" (statistic translation) (two words), "統計 機械翻訳" (statistics machine translation) (two words) are character strings (such as composite words) having the same meaning as that of "統計的機械翻訳" (statistic machine translation) (one word), but they do not match in words. Accordingly, when "統計 翻訳" (statics translation) (two words), "統計的 翻訳" (statistic translation) (two words), or "統計 機械翻訳" (statistic machine translation) (two words) is designated in a query for retrieval in words, "統計的機械翻訳" (statistic machine translation) does not hit in a database.

On the other hand, as in Example 2, "言語処理" (language processing), "自然言語処理" (natural language processing), and "自然言語の処理" (processing of natural language) are character strings of different variations having the same meaning. However, the character strings do not match in words. Accordingly, when "言語処理" (language processing) or "自然言語処理" (natural language processing) is designated in a query for retrieval in words, "自然言語の処理" (processing of natural language) does not hit in a database. Also, "統計を利用した機械翻訳" (machine translation using statistics), "統計による翻訳" (translation based on statistics), and "統計を使った機械翻訳" (machine translation using statistics) are character strings of different variations having the same meaning. However, the character strings do not match in words. As a result, when "統計を利用した 機械翻訳" (machine translation using statistics) or "統計による翻訳" (translation based on statistics) is designated for a retrieval in words, "統計を使った機械翻訳" (machine translation using statistics) does not hit in a database.

Against the existing condition of the retrieval illustrated in FIG. 30, a technology in the past divides a character string such as a composite word into words included in the character string and retrieves text data corresponding to a query based on combinations of the words. However, the technology in the past may retrieve a character string having a different meaning. In order to solve the issue, there are a technology in the past that uses a neighborhood retrieval and a technology in the past that uses a semantic analysis result for a retrieval.

FIG. 31 is a diagram for explaining a technology in the past that uses a neighborhood retrieval. According to this technology in the past, processing is performed in order of step S10 and step S11 to determine whether text 10*a* hits based on a condition designated in a query 15. When the text 10*a* hits to the condition designated in the query 15, the text 10*a* is text to be retrieved. As an example, it is assumed that "自然言語処理において、. . . " (In natural language processing, . . . ) is the text 10*a* to be compared.

The technology in the past in step S10 retrieves words included in the composite word in the character string "自然言語処理" (natural language processing) in the text 10*a* and divides the composite word into words to generate division data 10*b*. In the example illustrated in FIG. 31, "自然言語処理" (natural language processing) is divided into words "自然" (natural), "言語" (language), and "処理" (processing).

It is assumed that the query 15 is set as ("自然" near:2 "言語") AND ("言語" near:2 "処理") AND ("自然" near:2 "処理"). In this case, "first word near:N second word" is a condition indicating that the degree of neighborhood between the first word and the second word is equal to or lower than N. The degree of neighborhood between the first word and the second word indicates a difference value between an offset of the first word and an offset of the second word. For example, when the word "自然" is the first word in the division data 10*b*, the offsets of the words "自然" "言語", and "処理" are "1", "2", and "3", respectively.

In other words, for example, ("自然" near:2 "言語") in the query 15 is a condition indicating that the degree of neighborhood between the word "自然" and the word "言語" is equal to or lower than 2. ("言語" near:2 "処理") is a condition indicating that the degree of neighborhood between the word "言語" and the word "処理" is equal or lower than 2. ("自然" near:2 "処理") is a condition indicating that the degree of neighborhood between the word "自然" and the word "処理" is equal to or lower than 2. Because the conditions in the query 15 are defined with "AND", text satisfying all of the conditions is a retrieval target.

In the division data 10*b*, the degree of neighborhood between "自然" and "言語" is calculated as "the degree of neighborhood=2−1=1", which satisfies the condition ("自然" near:2 "言語"). In the division data 10*b*, the degree of neighborhood between "言語" and "処理" is calculated as "the degree of neighborhood=3−2=1", which satisfies the condition ("言語" near:2 "処理"). In the division data 10*b*, the degree of neighborhood between "自然" and "処理" is calculated as "the degree of neighborhood=3−1=2", which satisfies the condition ("自然" near:2 "処理"). In other words, for example, because the division data 10*b* satisfies the conditions indicated in the query 15, the text 10*a* is retrieved.

Next, the technology in the past will be described that uses a semantic analysis result for retrieval. The technology in the past includes a step of performing a retrieval by using words included in a composite word and a step of verifying the retrieved result based on a semantic structure and determining whether the retrieved result is text to be retrieved or not.

FIG. 32 is a diagram illustrating an example of a result of a semantic structure analysis according to the technology in the past. As illustrated in FIG. 32, a character string "自然言語処理" (natural language processing) is divided into words "自然" (natural), "言語" (language), and "処理" (processing) by a semantic structure analysis, and the words are associated by an arc from a node 20*c* corresponding to "処理" to a node 20*b* corresponding to "言語". The words are also associated by an arc from the node 20*b* to a node 20*a* corresponding to "自然". The term "arc" refers to information indicating a dependency between words. A character string "自然な処理" (natural processing) is divided into words "自然" (natural) and "処理" (processing) by a semantic structure analysis, and the words are associated by an arc from a node 21*b* corresponding to "処理" to a node 21*a* corresponding to "自然".

A character string "言語処理" (language processing) is divided into words "言語" (language) and "処理" (processing), and the words are associated by an arc from a node 22*b* corresponding to "処理" to a node 22*a* corresponding to "言語". A character string "処理言語" (processing language) is divide into words "言語" (language) and "処理" (processing), and the words are associated by an arc from a node 23*a* corresponding to "言語" to a node 23*b* corresponding to "処理".

This technology in the past includes notational matching and semantic matching for performing retrieval as described with reference to FIG. 32 to suppress a retrieval of a character string having a different meaning from a character string to be retrieved.

Related techniques are disclosed in, for example, Japanese Laid-open Patent Publication Nos. 11-203312, 2004-46438 and 2000-322449.

SUMMARY

According to an aspect of the embodiments, an apparatus generates an index including positions of morphemes included in a target text data and semantic attributes between the morphemes corresponding to the positions. The apparatus gives information including positions of morphemes included in an input query and semantic attributes between the morphemes corresponding to the positions to the query, and executes a retrieval on the target text data, based on the information given to the query and the index.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a data structure of a text DB;

FIG. 3 is a diagram illustrating an example of a data structure of an index table;

FIG. 13 is a second diagram for explaining the process that extracts an independent word part;

FIG. 15 is a second diagram for explaining the process that performs conversions for operations;

FIG. 17 is a third diagram for explaining a process that extracts an independent word part;

FIG. 18 is a third diagram for explaining the process that performs conversions for operations;

FIG. 23 is a diagram for explaining an example of hashing of an index;

FIG. 24 is a diagram illustrating an example of processing that reconstructs from a hashed index;

FIG. 30 is a diagram for explaining the existing condition of retrievals;

DESCRIPTION OF EMBODIMENTS

The technologies in the past may not quickly and highly accurately perform a retrieval considering semantic attributes.

Figure 31:
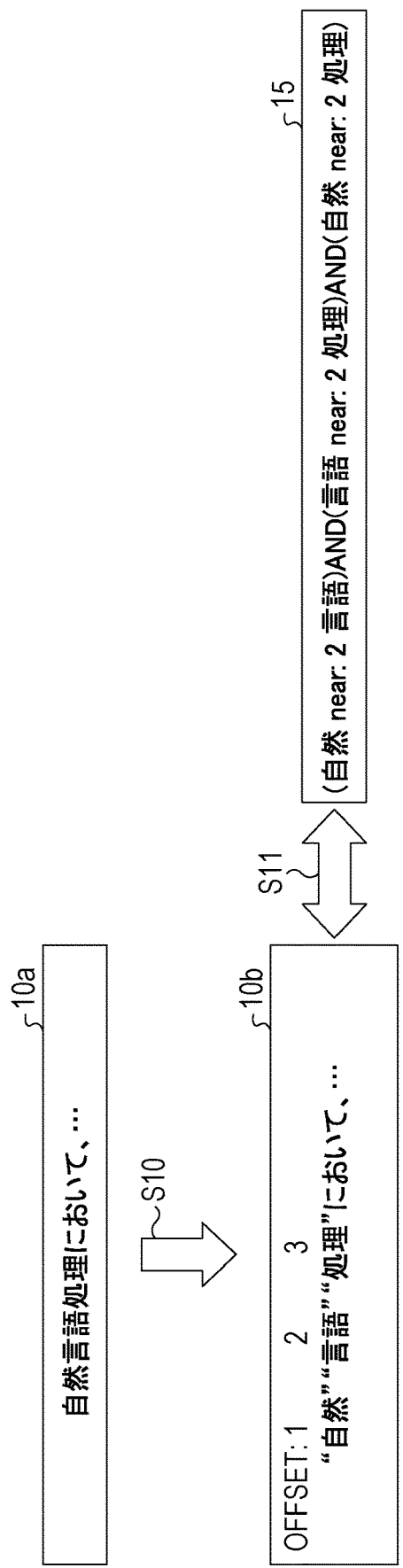
FIG. 31 is a diagram for explaining a technology in the past that uses neighborhood retrieval.

According to the technology in the past using a neighborhood retrieval as described with reference to FIG. 31, the speed of the determination of a degree of neighborhood is low, and the retrieval takes time. For example, when "自然", "言語", and "処理" separately appear N times, M times, and P times, respectively, the process for determining the degree of neighborhood has a computational complexity order of (N×M+M×P+N×P). This computational complexity corresponds to a computational complexity of N squared.

Also, in the technology in the past using a neighborhood retrieval, it is difficult to determine the number to be set as the degree of neighborhood. A high degree of neighborhood may result in occurrence of noise, and a low degree of neighborhood may result in occurrence of retrieval omission.

Figure 33:
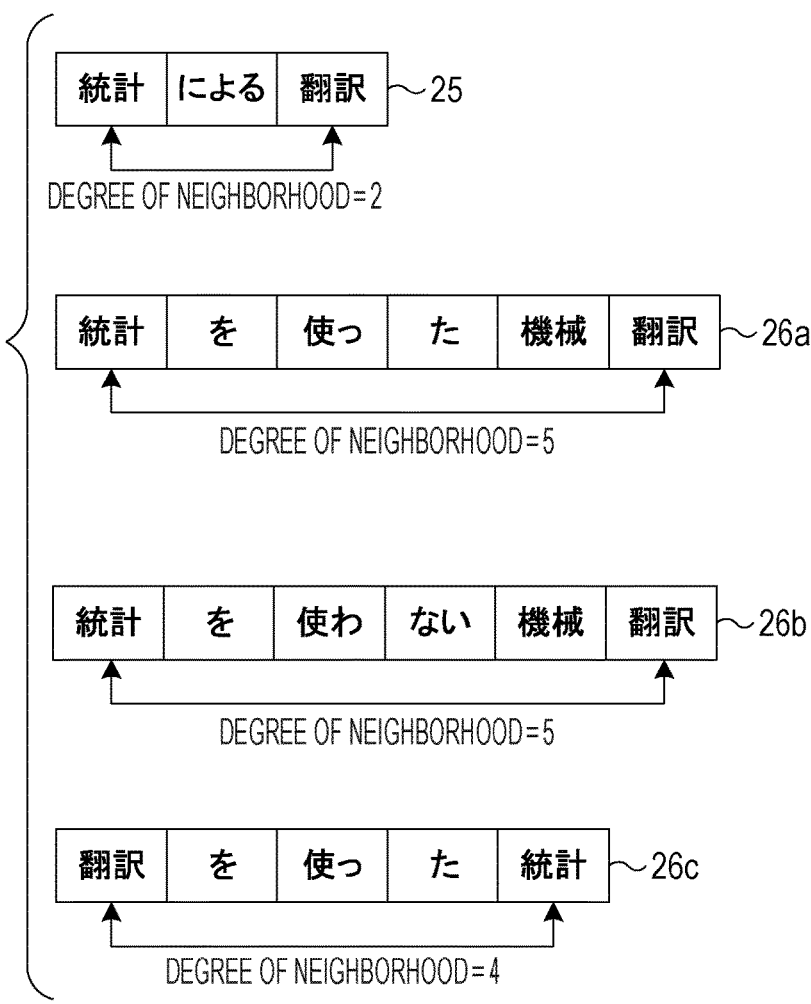
FIG. 33 is a diagram for explaining issues of the technology in the past which uses a neighborhood retrieval.

FIG. 33 is a diagram for explaining an issue of the technology in the past using a neighborhood retrieval. As an example, a case will be described in which "統計による翻訳" (translation based on statistics) is set in a query 25 to retrieve a text data piece 26a "統計を使った機械翻訳" (machine translation using statistics). For example, though the degree of neighborhood between "統計" (statistics) and "翻訳" (translation) is set "2" as a condition in the query 25 for a retrieval, the degree of neighborhood between "統計" and "翻訳" in the text data piece 26a is "5". Then, because the condition in the query 25 does not match with the text data piece 26a, the query 25 results in a retrieval omission of the text data piece 26a.

On the other hand, when the degree of neighborhood in the query 25 is changed to "5" for a retrieval, the text data piece 26a may be retrieved but the retrieval result also includes a text data piece 26b and a text data piece 26c, for example. The text data piece 26b has a degree of neighborhood of "5" but the text data piece 26b is "統計を使わない機械翻訳" (machine translation not using statistics) which does not correspond with the meaning of the query 25. The text data piece 26c has a degree of neighborhood of "4" but the text data piece 26c is "翻訳を使った統計" (statistics using translation) which does not correspond with the meaning of the query 25. In other words, when the degree of neighborhood is increased, the retrieval results include noise (text data pieces 26b and 26c), which means reduction of accuracy of the retrievals.

Figure 32:
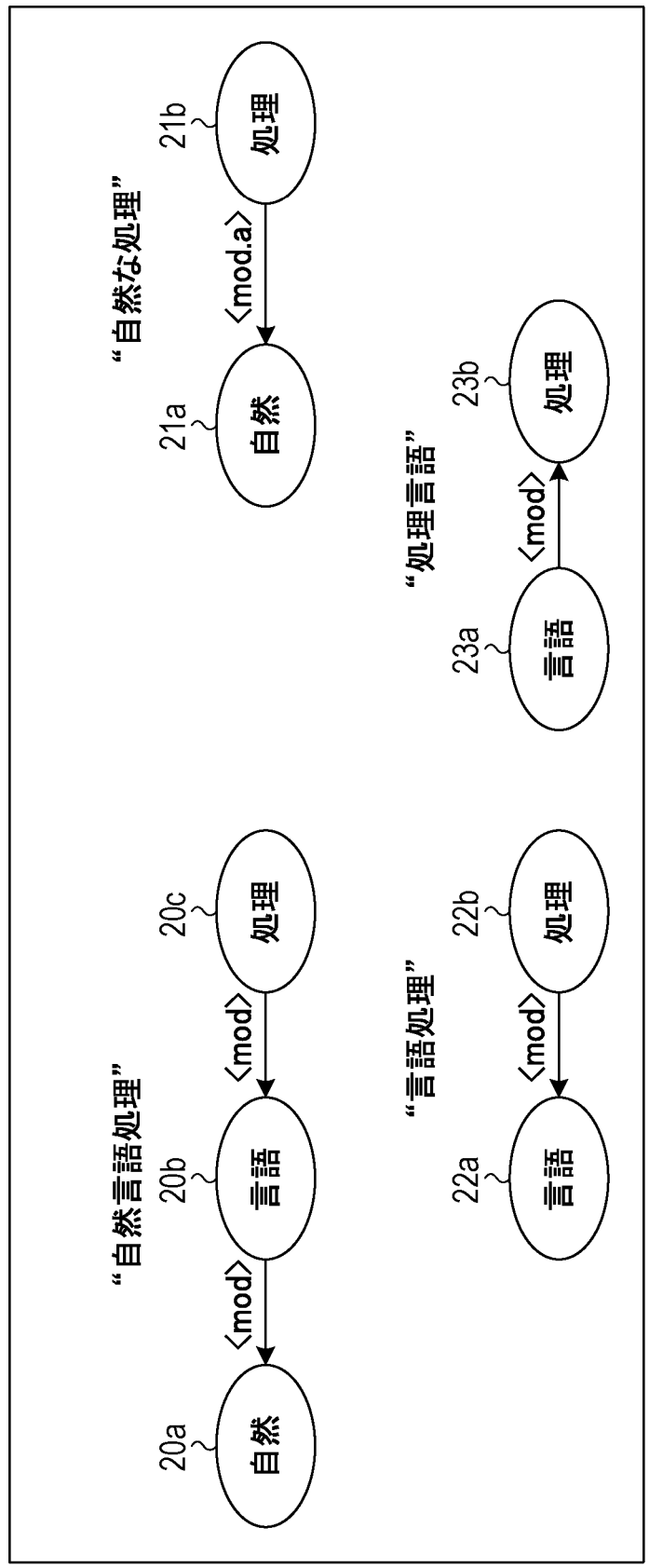
FIG. 32 is a diagram illustrating an example of a result of a semantic structure analysis according to the technology in the past.

The technology in the past which performs a retrieval by using a result of a semantic structure analysis described with reference to FIG. 32 is a retrieval (two-pass retrieval) including a step of performing a retrieval by using words included in a composite word and a step of verifying the retrieved result based on a semantic structure, which is difficult to quickly perform. The retrieval including notational matching and semantic matching described with reference to FIG. 32 causes a high computational load.

It is preferable to perform a retrieval considering semantic attributes by one pass without excessively increasing the size of index information.

Embodiments of a retrieval method, a retrieval program and a retrieval apparatus according to the present disclosure will be described in detail below. The present disclosure is not limited by the following embodiments.

Figure 1:
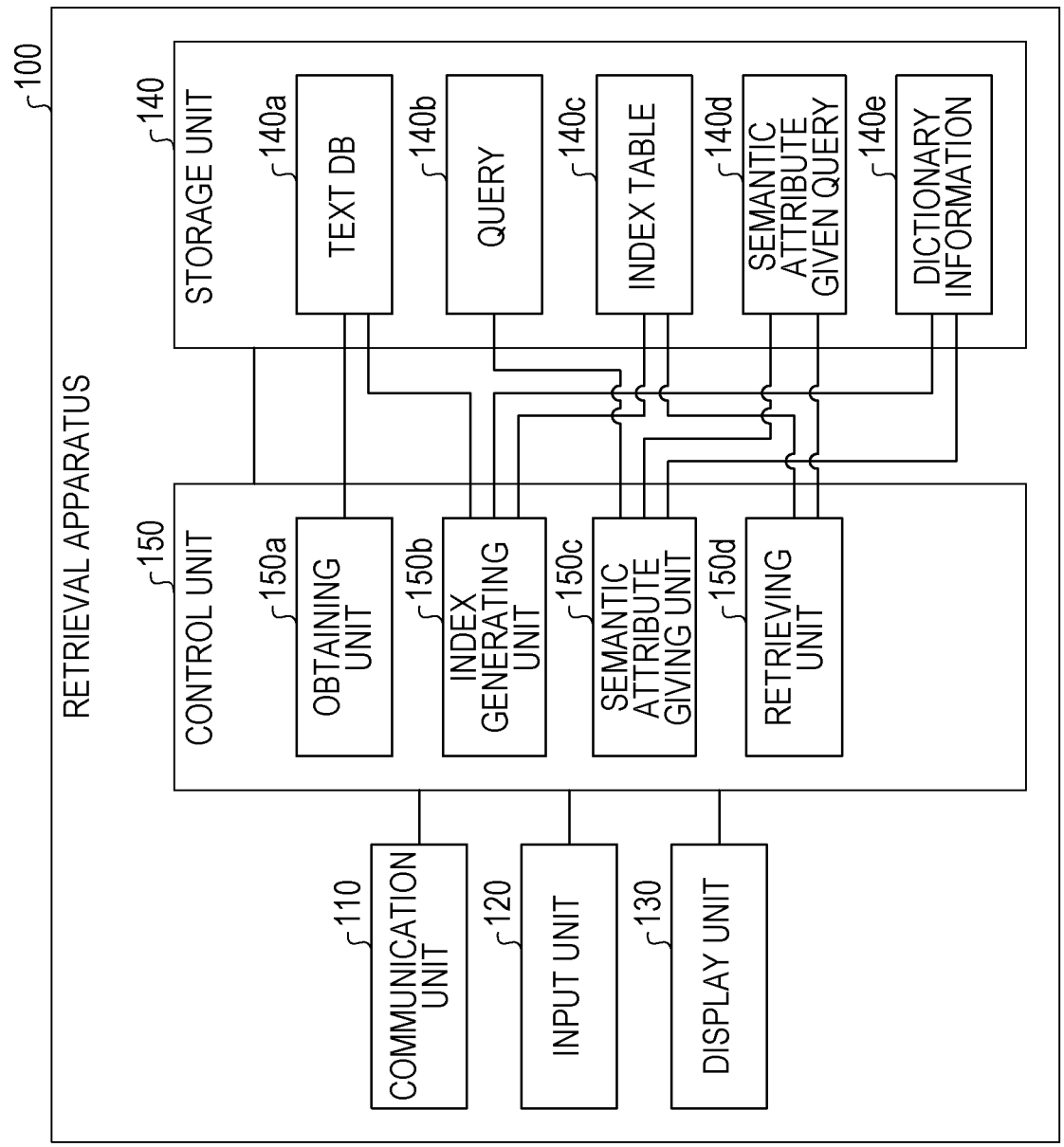
FIG. 1 is a functional block diagram illustrating a configuration of a retrieval apparatus according to an embodiment.

FIG. 1 is a functional block diagram illustrating a configuration of a retrieval apparatus according to an embodiment. As illustrated in FIG. 1, the retrieval apparatus 100 includes a communication unit 110, an input unit 120, a display unit 130, a storage unit 140, and a control unit 150.

The communication unit 110 is a processing unit that executes data communication with a server over a network. The communication unit 110 corresponds to a communication device. For example, the retrieval apparatus 100 may store in the storage unit 140 data of a text DB 140a, which will be described below, and an index table 140c received from a server. The communication unit 110 may receive data in a query from a terminal apparatus, for example, of a user over a network.

The input unit 120 is an input device that is to be used to input information to the retrieval apparatus 100. For example, the input unit 120 corresponds to a keyboard, a mouse, a touch panel or the like. A user may operate the input unit 120 to input data in a query.

The display unit 130 is a display device that displays data output from the control unit 150. For example, the display unit 130 corresponds to a liquid crystal monitor, a touch panel or the like. The display unit 130 displays a retrieval result to a query, which is executed by the control unit 150.

The storage unit 140 has the text DB 140a, a query 140b, the index table 140c, a semantic attribute given query 140d, and dictionary information 140e. The storage unit 140 corresponds to a storage device including a semiconductor memory element such as a random access memory (RAM), a read only memory (ROM) or a flash memory or a hard disk drive (HDD).

The text DB 140a is a database (DB) that holds a plurality of text data pieces to be retrieved by the query 140b. FIG. 2 is a diagram illustrating an example of a data structure of the text DB. As illustrated in FIG. 2, the text DB 140a stores text IDs and text data pieces in association. Each of the text IDs is information that uniquely identifies a text data piece. A text data piece here is information including a plurality of sentences.

The query 140b is information regarding a query designated by a user. The retrieval apparatus 100 retrieves from the text DB 140a a text data piece including a character string having the same meaning as that of the character string (such as a composite word) included in the query 140b, as will be described below.

The index table 140c is a table that holds an index corresponding to a text data piece in the text DB 140a. FIG. 3 is a diagram illustrating an example of a data structure of the index table. As illustrated in FIG. 3, the index table holds a text ID and an index in association. The text ID corresponds to the text ID described with reference to FIG. 2. The index is information regarding an index generated from a text data piece corresponding to a text ID. The index is information including positions of morphemes included in a text data piece and semantic attributes between the morphemes corresponding to the positions. The index will be specifically described below.

The semantic attribute given query 140d is information acquired by giving the positions of morphemes included in the query 140b and a semantic attribute between the morphemes corresponding to the positions to the query 140b. The semantic attribute given query 140d will be specifically described below.

The dictionary information 140e is information that defines a character string corresponding to a composite word. For example, the dictionary information 140e includes character strings such as "自然言語処理" (natural language processing), "言語処理" (language processing), "処理言語" (processing language), and "機械翻訳" (machine translation). A character string corresponding with a character string in the dictionary information 140e among the character strings (morphemes) included in a text data piece is identified as a composite word. The dictionary information 140e may include a character string analogous to a composite word.

The control unit 150 has an obtaining unit 150a, an index generating unit 150b, a semantic attribute giving unit 150c, and a retrieving unit 150d. The control unit 150 may be implemented by a central processing unit (CPU), a micro processing unit (MPU) or the like. The control unit 150 may also be implemented by a hard-wired logic such as an application specific integrated circuit (ASIC) or a field programmable gate array (FPGA).

The obtaining unit 150a is a processing unit that obtains information and stores the obtained information in the storage unit 140. For example, the obtaining unit 150a obtains the text DB 140a from a server on a network and stores the obtained text DB 140a in the storage unit 140. The obtaining unit 150a further obtains the query 140b from a user terminal apparatus on a network or from the input unit 120 and stores the obtained query 140b in the storage unit 140.

The index generating unit 150b is a processing unit that generates an index including positions of morphemes included in a text data piece stored in the text DB 140a and semantic attributes between the morphemes corresponding to the positions. After generating an index corresponding to a text data piece, the index generating unit 150b stores the text ID and the index in association in the index table 140c.

An example of the processing to be performed by the index generating unit 150b will be described below. The index generating unit 150b sequentially executes an identification process on a composite word and an expression analogous to a composite word, a dependency information setting process, and an index generation process.

The identification process on a composite word and an expression analogous to a composite word will be described. The index generating unit 150b obtains a text data piece from the text DB 140a and performs a morphological analysis on the obtained text data piece so that the character string of the text data piece is divided into a plurality of morphemes. The index generating unit 150b performs sampling on the morphemes to identify a morpheme corresponding to a word in morphemes acquired from the text data piece.

Through the sampling, the index generating unit 150b compares morphemes corresponding to words and the dictionary information 140e and thus identifies a morpheme corresponding to a composite word. Then, the index generating unit 150b decomposes the identified morpheme corresponding to a composite word into words. For example, the index generating unit 150b divides one morpheme "自然言語処理" (natural language processing) corresponding to a composite word into three morphemes "自然 (natural)", "言語" (language), and "処理" (processing).

The index generating unit 150b further performs the identification process on an expression analogous to a composite word. For example, the index generating unit 150b performs a syntactic analysis and a semantic analysis on an expression such as "統計を使わった機械翻訳" (machine translation using statistics) and identifies from where to where corresponds to an expression analogous to a composite word. The index generating unit 150b identifies, as an expression analogous to a composite word, a group of morphemes corresponding to three or fewer nodes directly connecting to a node of a morpheme of a composite word in a syntactic tree and a semantic structure acquired as a result of the syntactic analysis and the semantic analysis thereon. If the identification process is not performed for identifying an expression analogous to a composite word, the limitation of the number of nodes directly connecting to the composite word may not be provided.

For example, the index generating unit 150b identifies, as an expression analogous to a composite word, "統計を使った機械翻訳" (machine translation using statistics) included in a text data piece "今から示すのは、これまでに様々な研究機関により評価が進められた統計を使った機械翻訳に関する論文です" (A thesis will be presented which is about machine translation using statistics that has been evaluated by various research institutions so far). In this case, the index generating unit 150b does not identify the whole text data piece "今から示すのは、これまでに様々な研究機関により評価が進められた統計を使った機械翻訳に関する論文です" as an expression analogous to a composite word. Also, the index generating unit 150b does not identify "これまでに様々な研究機関により評価が進められた統計" as an expression analogous to a composite word. The index generating unit 150b does not identify "統計を使った機械" as an expression analogous to a composite word.

The dependency information setting process will be described. The index generating unit 150b performs a semantic analysis on a group of morphemes corresponding to a composite word and a group of morphemes corresponding to an expression analogous to a composite word and gives information regarding a governor and a dependent to nodes corresponding to the morphemes.

Figure 4:
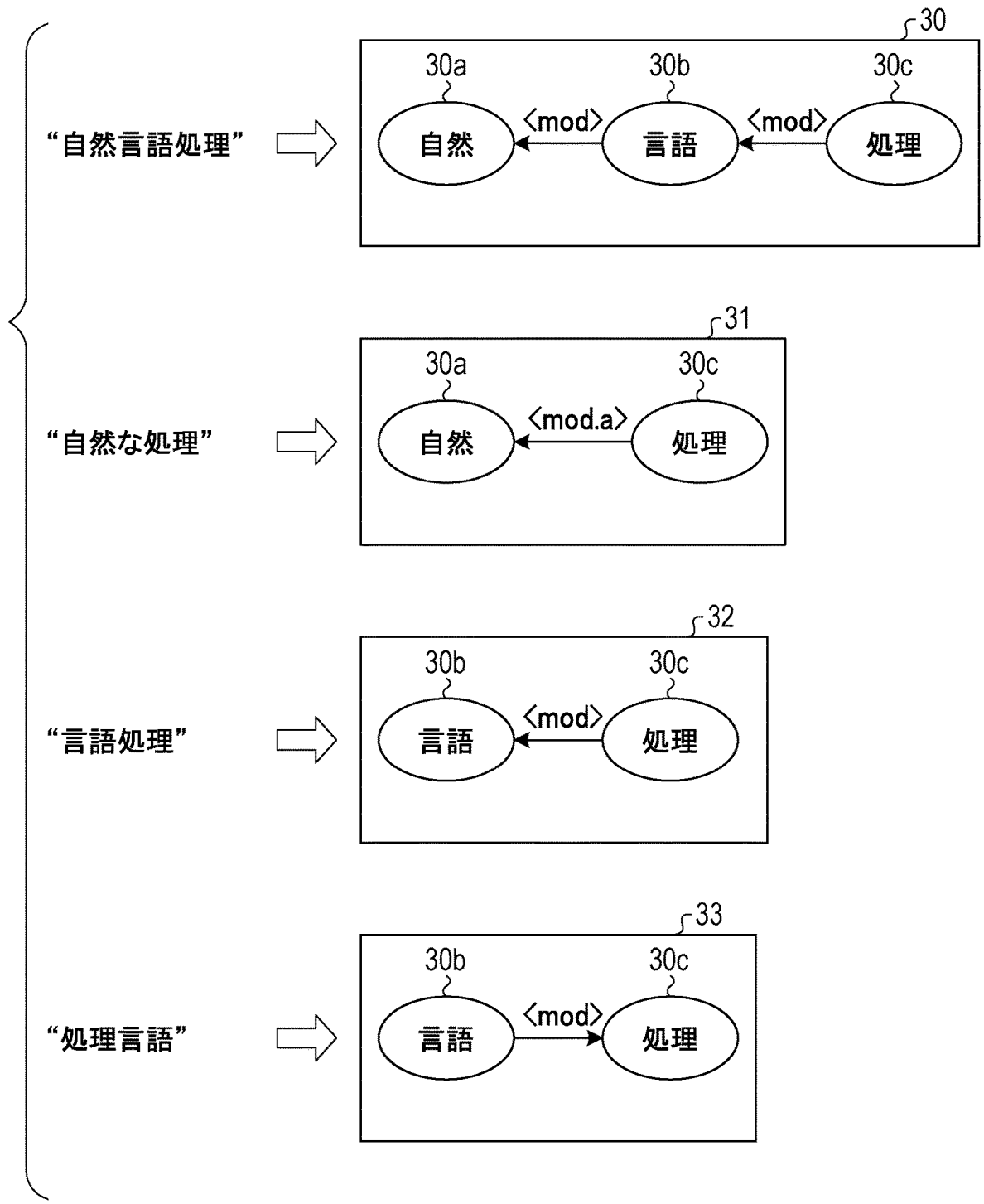
FIG. 4 is a first diagram illustrating dependency relationships acquired as results of a semantic analysis.
Figure 5:
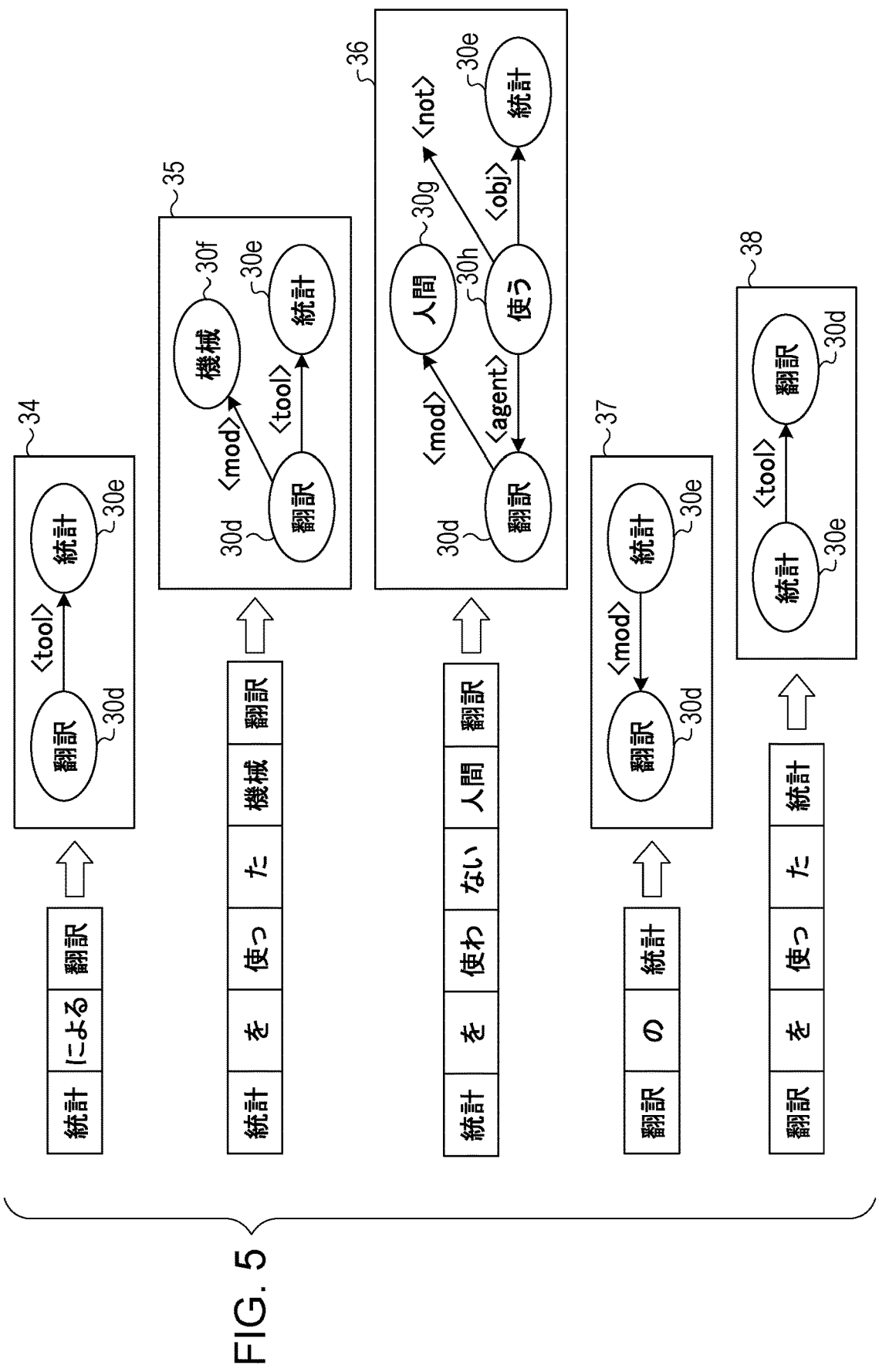
FIG. 5 is a second diagram illustrating dependency relationships acquired as results of a semantic analysis.

FIG. 4 and FIG. 5 are diagrams illustrating a dependency relationship acquired as results of semantic analyses. As illustrated in FIG. 4, a semantic analysis on a character string "自然言語処理" (natural language processing) produces a result 30. A node 30a corresponds to "自然". A node 30b corresponds to "言語". A node 30c corresponds to "処理". The node 30a and the node 30b are connected by an arc <mod> from the node 30b to the node 30a. The node 30b and the node 30c are connected by an arc <mod> from the node 30c to the node 30b.

A semantic analysis on a character string "自然な処理" (natural processing) produces a result 31. As indicated in the result 31, the node 30a and the node 30c are connected by an arc <mod.a> from the node 30c to the node 30a.

Comparing between the result 30 and result 31, the nodes connected by the arcs belong to different categories, and the arcs also belong to different categories. Therefore, meanings of "自然言語処理" (natural language processing) and "自然な処理" (natural processing) are different. The node 30a and the node 30c are directly connected in the result 31 while the node 30a and the node 30c are not directly connected in the result 30.

A semantic analysis on a character string "言語処理" (language processing) produces a result 32. As indicated in the result 32, the node 30b and the node 30c are connected by an arc <mod> from the node 30c to the node 30b.

A semantic analysis on a character string "処理言語" (processing language) produces a result 33. As indicated in the result 33, the node 30b and the node 30c are connected by an arc <mod> from the node 30b to the node 30c.

Comparing between the result 32 and the result 33, the arcs belong to the same category, and the nodes connected by the arcs belong to the same category. However, the arcs have different directions. Therefore, "言語処理" and "処理言語" (processing language) have different meanings.

FIG. 5 will be described. A semantic analysis on a character string "統計による翻訳" (translation based on statistics) produces a result 34. A node 30d corresponds to "翻訳" (translation). A node 30e corresponds to "統計" (statistics). The node 30d and the node 30e are connected by an arc <tool> from the node 30d to the node 30e.

A semantic analysis on a character string "統計を使った機械翻訳" (machine translation using statistics) produces a result 35. A node 30f corresponds to "機械" (machine). The node 30d and the node 30e are connected by an arc <tool> from the node 30d to the node 30e. The node 30d and the node 30f are connected by an arc <mod> from the node 30d to the node 30f.

A semantic analysis on a character string "統計を使わない人間翻訳" (human translation not using statistics) produces a result 36. A node 30g corresponds to "人間" (human). A node 30h corresponds to "使う" (use). The node 30d and the node 30g are connected by an arc <mod> from the node 30d to the node 30g. The node 30d and the node 30h are connected by an arc <agent> from the node 30h to the node 30d. An arc <not> is connected to the node 30h where the node 30h is a governor. The node 30h and the node 30e are connected by an arc <obj> from the node 30h to the node 30e.

A semantic analysis on a character string "翻訳の統計" (statistics of translation) produces a result 37. The node 30d and the node 30e are connected by an arc <mod> from the node 30e to the node 30d.

A semantic analysis on a character string "翻訳を使った統計" (statistics using translation) produces a result 38. The node 30e and the node 30d are connected by an arc <tool> from the node 30e to the node 30d.

Referring to FIG. 5, comparing between the result 34 and the result 35, the arcs connecting the node 30d and the node 30e belong to the same category and have the same direction. This indicates that the character strings "統計による翻訳" (translation based on statistics) and "統計を使った機械翻訳" (machine translation using statistics) have the same meaning. On the other hand, comparing the result 34 and the results 36, 37, and 38, the categories of the arcs, the directions of the arcs or the categories of the nodes connected to the arcs are different. Therefore, the character strings "統計による翻訳" (translation based on statistics) and "統計を使わない人間翻訳" (human translation not using statistics) have different meanings. The character strings "統計による翻訳" (translation based on statistics) and "翻訳の統計" (statistics of translation) have different meanings. The character strings "統計による翻訳" (translation based on statistics) and "翻訳を使った統計" (statistics using translation) have different meanings.

The index generation process will be described. The index generating unit 150b generates an index based on the results of the identification process and the dependency information setting process.

Figure 6:
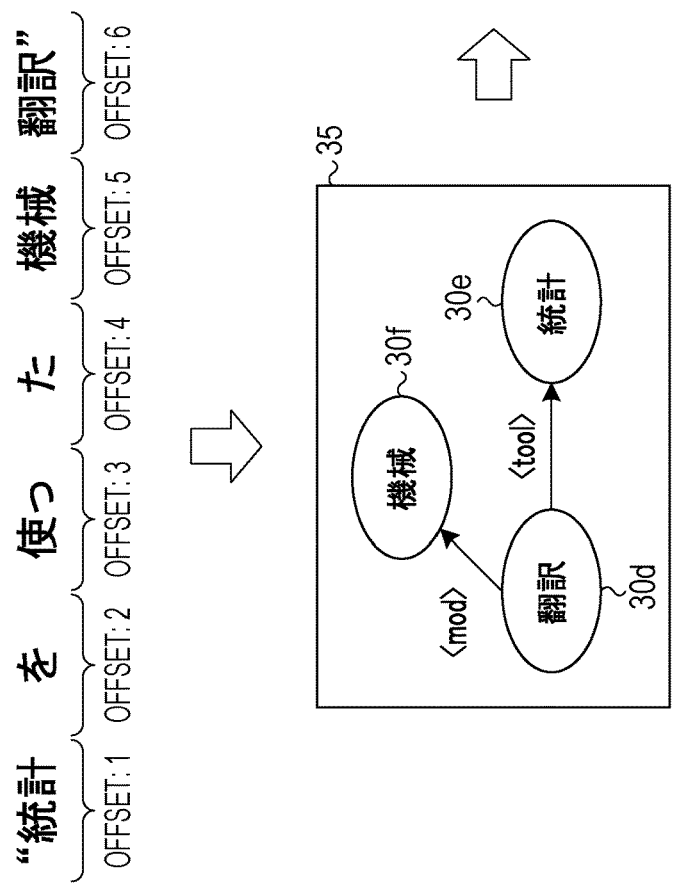
FIG. 6 is a first diagram for explaining processing that generates an index.

FIG. 6 to FIG. 11 are diagrams for explaining a process that generates an index. FIG. 6 will be described. With reference to FIG. 6, a case will be described in which an index 35a corresponding to a character string "統計を使った機械翻訳" (machine translation using statistics) is to be generated. The index has offsets on the horizontal axis and attributes on the vertical axis. The attributes on the vertical axis include morpheme attributes, arc attributes, and span attributes. The attributes are arranged on the vertical axis in preset order.

The index has morpheme attributes set for morphemes included in a character string. The morphemes for morpheme attributes are arranged in predetermined order from the top. For example, morphemes are arranged in the dictionary order. The index has arc attributes set for nodes corresponding to the morphemes. Each of the arcs has a starting point and an end point for each category of the arc. The index has span attributes having information indicating a distance between morphemes corresponding to nodes connected by an arc in a character string. The offset is information to be set for each of morphemes included in a character string. Offsets "1", "2", "3", . . . "n" are assigned in order from the first morpheme.

The index generating unit 150b executes a semantic analysis on a character string "統計を使った機械翻訳" (machine translation using statistics) to produce the result 35, as described above. The character string "統計を使った機械翻訳" (machine translation using statistics) is divided into morphemes "統計", "を", "使っ", "た", "機械", "翻訳", and the offsets of the morphemes are "1", "2", "3", "4", "5", "6" in order. Based on the data, the index generating unit 150b generates an index 35a corresponding to the character string "統計を使った機械翻訳" (machine translation using statistics). Each of the positions in the index 35a has an initial value "0".

Processing will be described that sets a flag (bit) at rows of the morpheme attributes in the index 35a by the index generating unit 150b. The index generating unit 150b sets a flag "1" at a position where a row having the morpheme "統計" and a column having the offset "1" cross. The index generating unit 150b sets a flag "1" at a position where a row having the morpheme "機械" and a column having the offset "5" cross. The index generating unit 150b sets a flag "1" at a position where a row having the morpheme "翻訳" and a column having the offset "6" cross. The index generating unit 150b sets a flag "1" at a position where a row having the morpheme "使う(使っ)" and a column having the offset "3" cross. The index generating unit 150b sets a flag "1" at a position where a row having the morpheme "を" and a column having the offset "2" cross. The index generating unit 150b sets a flag "1" at a position where a row having the morpheme "た" and a column having the offset "4" cross.

Processing will be described that sets a flag on a row having an arc attribute in the index 35a by the index generating unit 150b. In the result 35, the node 30d and the node 30f are connected by an arc <mod> from the node 30d to the node 30f. The node 30d corresponds to the morpheme "翻訳" at the offset "6". The node 30f corresponds to the morpheme "機械" at the offset "5". Therefore, the index generating unit 150b sets a flag "1" at a position where a row having a "mod starting point" and a column having the offset "6" cross. The index generating unit 150b sets a flag "1" at a position where a row having a "mod end point" and a column having the offset "5" cross.

In the result 35, the node 30d and the node 30e are connected by an arc <tool> from the node 30d to the node 30e. The node 30d corresponds to the morpheme "翻訳" at the offset "6". The node 30e corresponds to the morpheme "統計" at the offset 1. Therefore, the index generating unit 150b sets a flag "1" at a position where a row having a "tool starting point" and a column having the offset "6" cross. The index generating unit 150b sets a flag "1" at a position where a row having a "tool end point" and a column having the offset "1" cross.

Processing will be described that sets a flag on a row having a span attribute in the index 35a by the index generating unit 150b. The distance (span) between the morphemes "翻訳" and "機械" in the character string corresponding to the nodes 30*d* and 30*f* connected by the arc <mod> is "1". Therefore, the index generating unit 150*b* sets a flag "1" at a position where a row having span1 and columns having the offsets "5" and "6" cross.

The distance (span) between morphemes "翻訳" and "統計" in the character string corresponding to the nodes 30*d* and 30*e* connected by the arc <tool> is "5". Therefore, the index generating unit 150*b* sets a flag "1" at positions where a row having span5 and columns having the offsets "1" and "6" cross.

Providing span attributes allows setting of arc attributes without ambiguity. Furthermore, relationships between words in the other sentences may be excluded. For example, with reference to the span attributes in the index 35*a*, it is clear that, among morpheme nodes connected by arcs, the node of "機械" and the node of "翻訳" are grouped, and the node of "統計" and the node of "翻訳" are grouped, and it is clear that the node of "統計" and the node of "機械" are not directly connected.

By performing the aforementioned process, the index generating unit 150*b* generates the index 35*a* corresponding to the character string "統計を使った機械翻訳" (machine translation using statistics).

Figure 7:
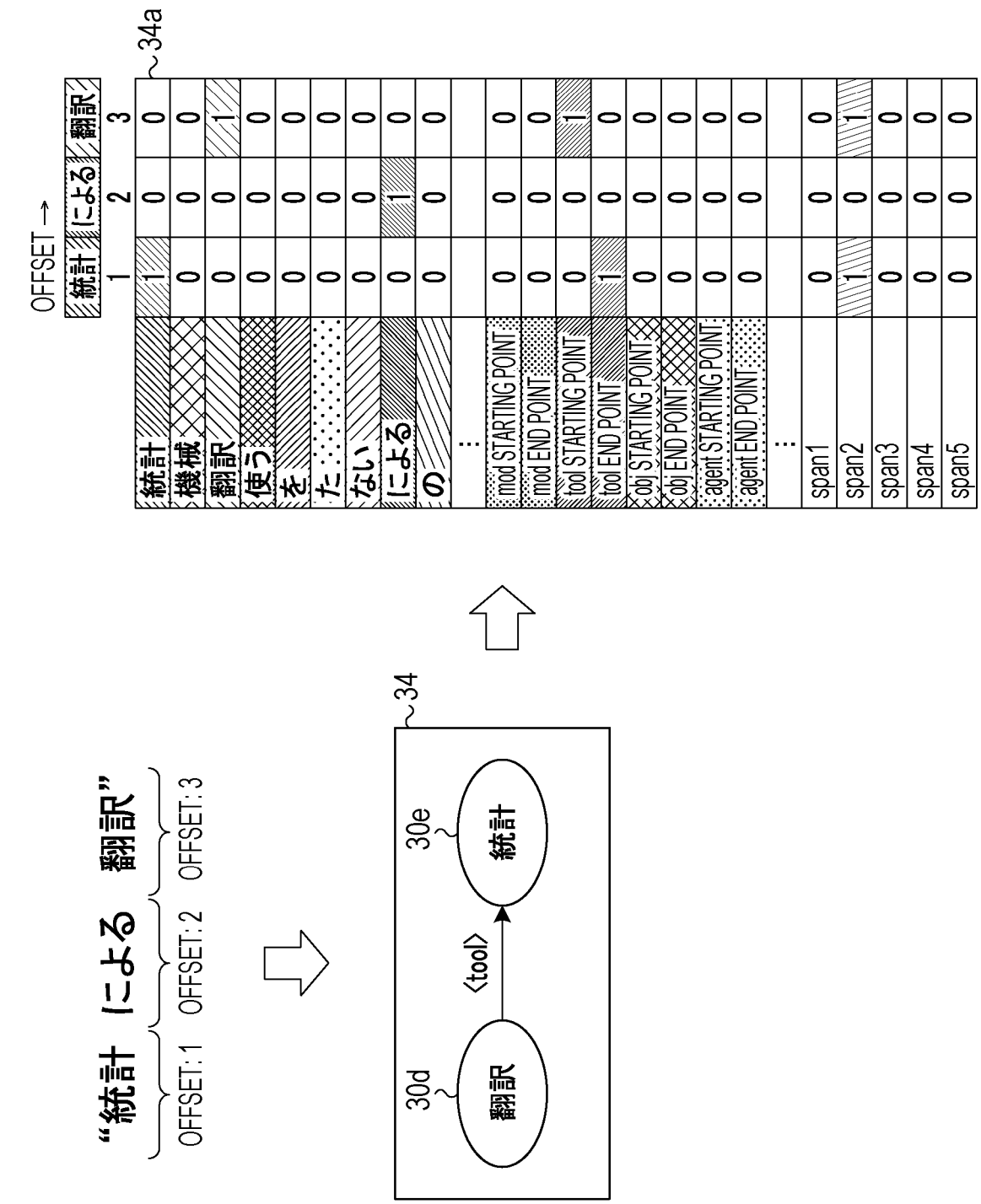
FIG. 7 is a second diagram for explaining processing that generates an index.

Next, FIG. 7 will be described. With reference to FIG. 7, a case will be described in which an index 34*a* corresponding to a character string "統計による翻訳" (translation based on statistics) is to be generated. The index 34*a* has offsets on the horizontal axis and attributes on the vertical axis, like the index 35*a*.

The index generating unit 150*b* executes a semantic analysis on the character string "統計による翻訳" (translation based on statistics) to produce the result 34, as described above. The character string "統計による翻訳" (translation based on statistics) is divided into morphemes "統計", "による", and "翻訳", and the offsets of the morphemes are "1", "2", "3" in order. Based on the data, the index generating unit 150*b* generates an index 34*a* corresponding to the character string "統計による翻訳" (translation based on statistics). Each of the positions in the index 34*a* has an initial value "0".

Processing will be described that sets a flag at rows of the morpheme attributes in the index 34*a* by the index generating unit 150*b*. The index generating unit 150*b* sets a flag "1" at a position where a row having the morpheme "統計" and a column having the offset "1" cross. The index generating unit 150*b* sets a flag "1" at a position where a row having the morpheme "翻訳" and a column having the offset "3" cross. The index generating unit 150*b* sets a flag "1" at a position where a row having the morpheme "による" and a column having the offset "2" cross.

Processing will be described that sets a flag at rows of arc attributes in the index 34*a* by the index generating unit 150*b*. In the result 34, the node 30*d* and the node 30*e* are connected by an arc <tool> from the node 30*d* to the node 30*e*. The node 30*d* corresponds to the morpheme "翻訳" at the offset "3". The node 30*e* corresponds to the morpheme "統計" at the offset "1". Therefore, the index generating unit 150*b* sets a flag "1" at a position where a row having a "tool starting point" and a column having the offset "3" cross. The index generating unit 150*b* sets a flag "1" at a position where a row having a "tool end point" and a column having the offset "1" cross.

Processing will be described that sets a flag at rows of span attributes in the index 34*a* by the index generating unit 150*b*. The distance (span) between the morphemes "翻訳" and "統計" in the character string corresponding to the nodes 30*d* and 30*e* connected by the arc <tool> is "2". Therefore, the index generating unit 150*b* sets a flag "1" at a position where a row having span2 and columns having the offsets "1" and "3" cross.

Figure 8:
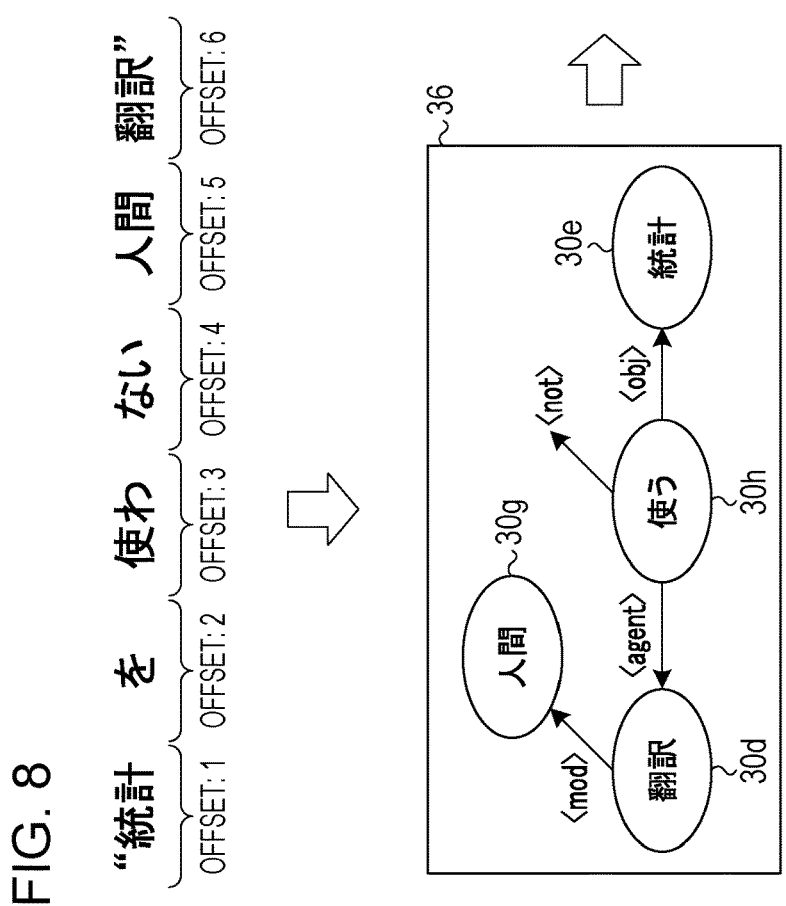
FIG. 8 is a third diagram for explaining processing that generates an index.

Next, FIG. 8 will be described. With reference to FIG. 8, a case will be described in which an index 36*a* corresponding to a character string "統計を使わない機械翻訳" (machine translation not using statistics) is to be generated. The index 36*a* has offsets on the horizontal axis and attributes on the vertical axis, like the index 35*a*.

The index generating unit 150*b* executes a semantic analysis on the character string "統計を使わない機械翻訳" (machine translation not using statistics) to produce the result 36, as described above. The character string "統計を使わない機械翻訳" (machine translation not using statistics) is divided into morphemes "統計", "を", "使う(使わ)", "ない", "機械", and "翻訳", and the offsets of the morphemes are "1", "2", "3", "4", "5", "6" in order. Based on the data, the index generating unit 150*b* generates an index 36*a* corresponding to the character string "統計を使わない機械翻訳" (machine translation not using statistics). Each of the positions in the index 36*a* has an initial value "0".

Processing will be described that sets a flag at rows of the morpheme attributes in the index 36*a* by the index generating unit 150*b*. The index generating unit 150*b* sets a flag "1" at a position where a row having the morpheme "統計" and a column having the offset "1" cross. The index generating unit 150*b* sets a flag "1" at a position where a row having the morpheme "人間" and a column having the offset "5" cross. The index generating unit 150*b* sets a flag "1" at a position where a row having the morpheme "翻訳" and a column having the offset "6" cross. The index generating unit 150*b* sets a flag "1" at a position where a row having the morpheme "使う" and a column having the offset "3" cross. The index generating unit 150*b* sets a flag "1" at a position where a row having the morpheme "を" and a column having the offset "2" cross. The index generating unit 150*b* sets a flag "1" at a position where a row having the morpheme "ない" and a column having the offset "4" cross.

Processing will be described that sets a flag on a row having an arc attribute in the index 36*a* by the index generating unit 150*b*. In the result 36, the node 30*d* and the node 30*g* are connected by an arc <mod> from the node 30*d* to the node 30*g*. The node 30*d* corresponds to the morpheme "翻訳" at the offset "6". The node 30*g* corresponds to the morpheme "人間" at the offset "5". Therefore, the index generating unit 150*b* sets a flag "1" at a position where a row having a "mod starting point" and a column having the offset "6" cross. The index generating unit 150*b* sets a flag "1" at a position where a row having "mod end point" and a column having the offset "5" cross.

In the result 36, the node 30*h* and the node 30*e* are connected by an arc <obj> from the node 30*h* to the node 30*e*. The node 30*h* corresponds to the morpheme "使う" at the offset 3. The node 30*e* corresponds to the morpheme "統計" at the offset "1". Therefore, the index generating unit 150*b* sets a flag "1" at a position where a row having "obj starting point" and a column having the offset "3" cross. The index generating unit 150*b* sets a flag "1" at a position where a row having "obj end point" and a column having the offset "1" cross.

In the result 36, the node 30*d* and the node 30*h* are connected by an arc <agent> from the node 30*h* to the node 30*d*. The node 30*d* corresponds to the morpheme "翻訳" at the offset "6". The node 30*h* corresponds to the morpheme "使う" at the offset "3". Therefore, the index generating unit 150*b* sets a flag "1" at a position where a row having "agent starting point" and a column having the offset "3" cross. The index generating unit 150b sets a flag "1" at a position where a row having "agent end point" and a column having the offset "6" cross.

In the result 36, an arc <not> is connected to the node 30h. The node 30h corresponds to the morpheme "使う" at the offset "3". Therefore, the index generating unit 150b sets a flag "1" at a position where a row having "NOT starting point" and a column having the offset "3" cross.

Processing will be described that sets a flag on a row having a span attribute in the index 36a by the index generating unit 150b. The distance (span) between the morphemes "翻訳" and "人間" in the character string corresponding to the nodes 30d and 30g connected by the arc <mod> is "1". Therefore, the index generating unit 150b sets a flag "1" at positions where a row having span1 and columns having the offsets "5" and "6" cross.

The distance (span) between the morphemes "統計" and "使う" in the character string corresponding to the nodes 30d and 30h connected by the arc <obj> is "2". Therefore, the index generating unit 150b sets a flag "1" at positions where a row having span2 and columns having the offsets "1" and "3" cross.

The distance (span) between the morphemes "使う" and "翻訳" in the character string corresponding to the nodes 30d and 30h connected by the arc <agent> is "3". Therefore, the index generating unit 150b sets a flag "1" at positions where a row having span3 and columns having the offsets "3" and "6" cross.

Figure 9:
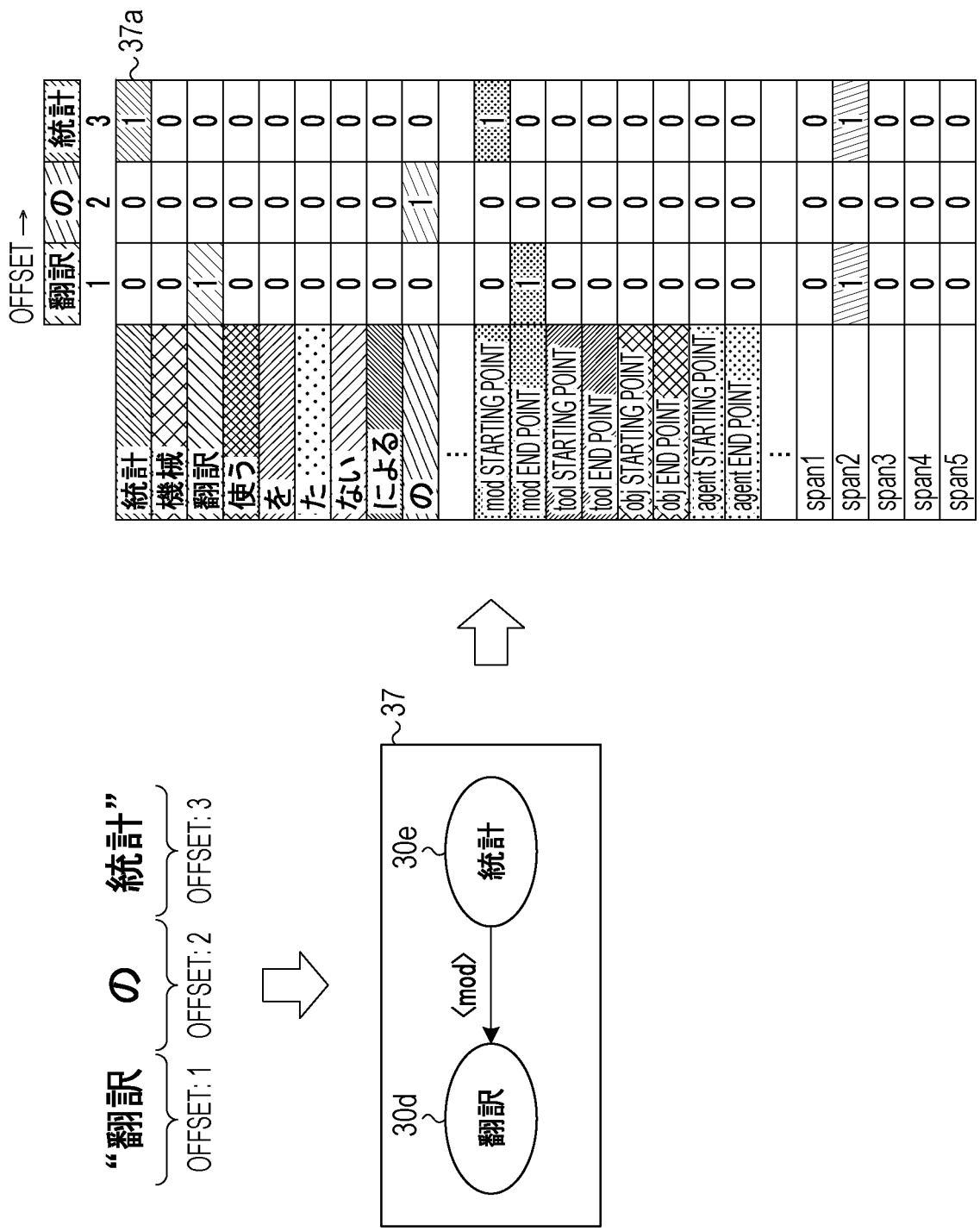
FIG. 9 is a fourth diagram for explaining processing that generates an index.

Next, FIG. 9 will be described. With reference to FIG. 9, a case will be described in which an index 37a corresponding to a character string " 翻訳の統計 (statistics of translation)" is to be generated. The index 37a has offsets on the horizontal axis and attributes on the vertical axis, like the index 35a.

The index generating unit 150b executes a semantic analysis on the character string " 翻訳の統計 " (statistics of translation) to produce the result 37, as described above. The character string " 翻訳の統計 " (statistics of translation) is divided into morphemes "翻訳", "の", and "統計", and the offsets of the morphemes are "1", "2", "3" in order. Based on the data, the index generating unit 150b generates an index 37a corresponding to the character string " 翻訳の統計 " (statistics of translation). Each of the positions in the index 37a has an initial value "0".

Processing will be described that sets a flag at rows of the morpheme attributes in the index 37a by the index generating unit 150b. The index generating unit 150b sets a flag "1" at a position where a row having the morpheme "統計" and a column having the offset "3" cross. The index generating unit 150b sets a flag "1" at a position where a row having the morpheme "翻訳" and a column having the offset "1" cross. The index generating unit 150b sets a flag "1" at a position where a row having the morpheme " " and a column having the offset "2" cross.

Processing will be described that sets a flag at rows of arc attributes in the index 37a by the index generating unit 150b. In the result 37, the node 30d and the node 30e are connected by an arc <mod> from the node 30e to the node 30d. The node 30d corresponds to the morpheme "翻訳" at the offset "1". The node 30e corresponds to the morpheme "統計" at the offset "3". Therefore, the index generating unit 150b sets a flag "1" at a position where a row having a "mod starting point" to a column having the offset "3" cross. The index generating unit 150b sets a flag "1" at a position where a row having a "mod end point" and a column having the offset "1" cross.

Processing will be described that sets a flag on a row having a span attribute in the index 37a by the index generating unit 150b. The distance (span) between the morphemes "翻訳" and "統計" in the character string corresponding to the nodes 30d and 30e connected by the arc <mod> is "2". Therefore, the index generating unit 150b sets a flag "1" at positions where a row having span2 and columns having the offsets "1" and "3" cross.

Figure 10:
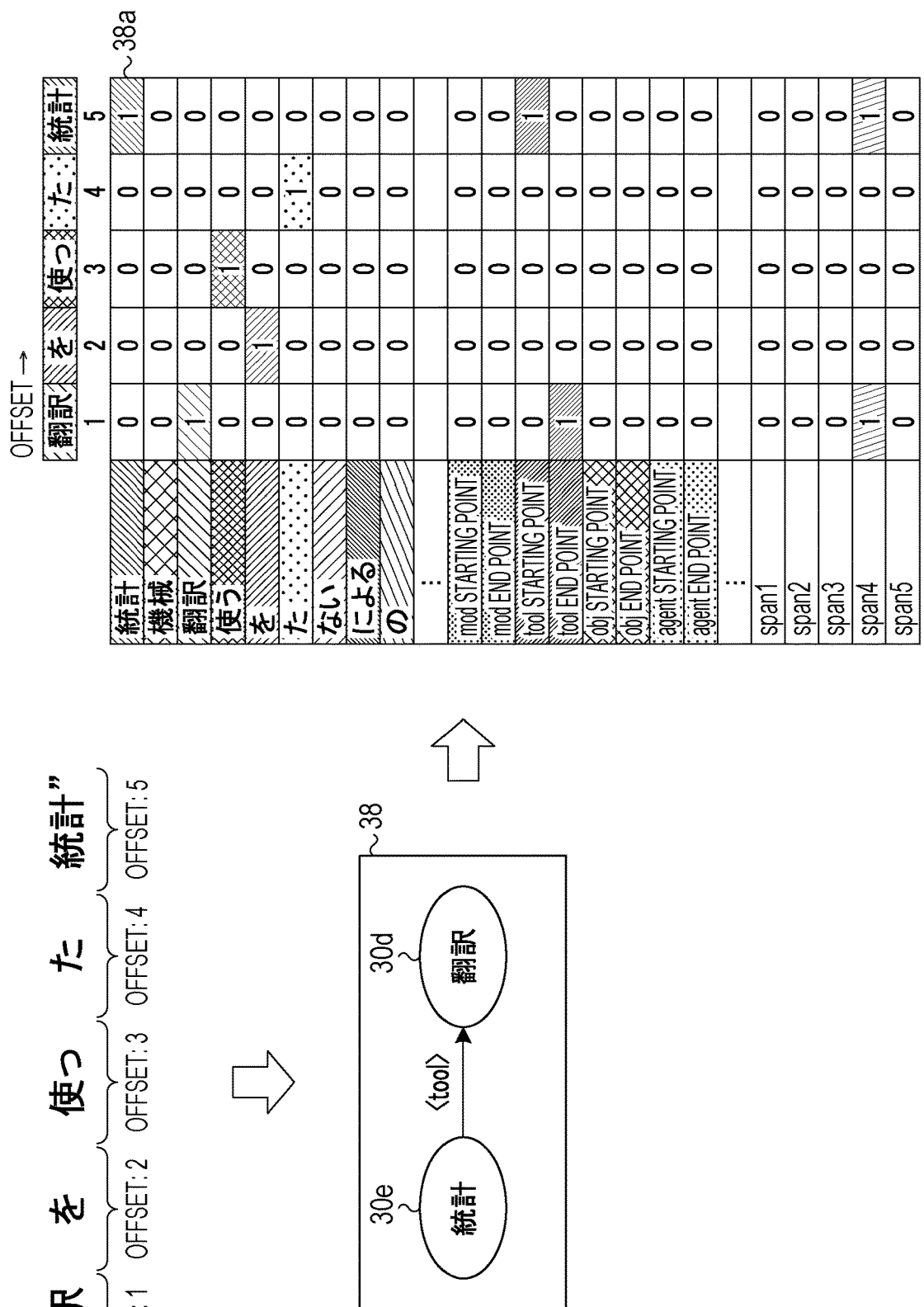
FIG. 10 is a fifth diagram for explaining processing that generates an index.

Next, FIG. 10 will be described. With reference to FIG. 10, a case will be described in which an index 38a corresponding to a character string "翻訳を使った統計" (statistics using translation) is to be generated. The index 38a has offsets on the horizontal axis and attributes on the vertical axis, like the index 35a.

The index generating unit 150b executes a semantic analysis on the character string "翻訳を使った統計" (statistics using translation) to produce the result 38, as described above. The character string "翻訳を使った統計" (statistics using translation) is divided into morphemes "翻訳", "を", "使う(使っ)", "た", and "統計", and the offsets of the morphemes are "1", "2", "3", "4", "5" in order. Based on the data, the index generating unit 150b generates an index 38a corresponding to the character string "翻訳を使った統計" (statistics using translation). Each of the positions in the index 38a has an initial value "0".

Processing will be described that sets a flag at rows of the morpheme attributes in the index 38a by the index generating unit 150b. The index generating unit 150b sets a flag "1" at a position where a row having the morpheme "統計" and a column having the offset "5" cross. The index generating unit 150b sets a flag "1" at a position where a row having the morpheme "翻訳" and a column having the offset "1" cross. The index generating unit 150b sets a flag "1" at a position where a row having the morpheme "使う" and a column having the offset "3" cross. The index generating unit 150b sets a flag "1" at a position where a row having the morpheme "た" and a column having the offset "4" cross.

Processing will be described that sets a flag at rows of arc attributes in the index 38a by the index generating unit 150b. In the result 38, the node 30d and the node 30e are connected by an arc <tool> from the node 30e to the node 30d. The node 30d corresponds to the morpheme "翻訳" at the offset "1". The node 30e corresponds to the morpheme "統計" at the offset "5". Therefore, the index generating unit 150b sets a flag "1" at a position where a row having "tool starting point" and a column having the offset "5" cross. The index generating unit 150b sets a flag "1" at a position where a row having "tool end point" and a column having the offset "1" cross.

Processing will be described that sets a flag at rows of span attributes in the index 38a by the index generating unit 150b. The distance (span) between the morpheme "翻訳" and "統計" in the character string corresponding to the nodes 30d and 30e connected by the arc <tool> is "4".

Therefore, the index generating unit 150*b* sets a flag "1" at positions where a row having span4 and columns having the offsets 1 and 5 cross.

Figure 11:
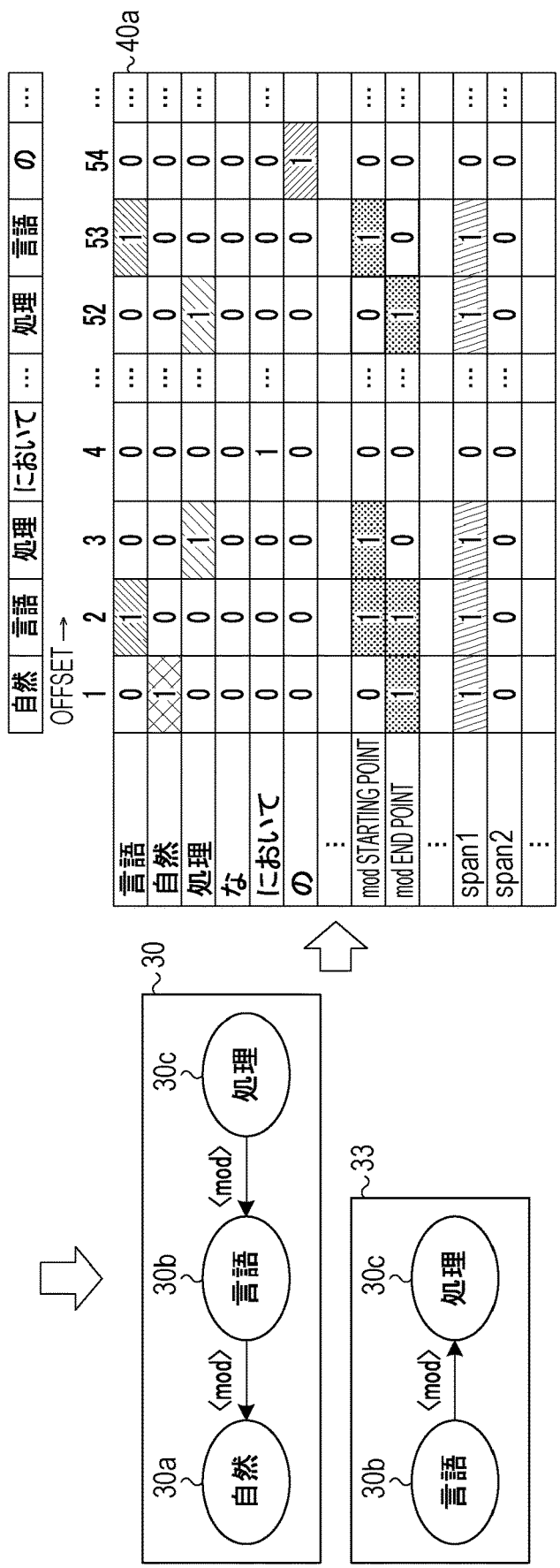
FIG. 11 is a sixth diagram for explaining processing that generates an index.

Next, FIG. 11 will be described. With reference to FIG. 11, a case will be described in which an index 40*a* corresponding to a character string "自然言語処理において . . . 処理言語の . . . " (In natural language processing, . . . of processing language . . . ) is to be generated. The index 40*a* has offsets on the horizontal axis and attributes on the vertical axis, like the index 35*a*.

The index generating unit 150*b* executes a semantic analysis on a character string "自然言語処理" (natural language processing) to produce the result 30. The index generating unit 150*b* executes a semantic analysis on a character string "処理言語" (processing language) to produce the result 33. The character string "自然言語処理において . . . 処理言語の . . . " is divided into morphemes "自然", "言語", "処理", "において" " . . . " (an omission), "処理", "言語", "の". For example, it is assumed that the offsets "自然", "言語", "処理", and "において" are "1", "2", "3", "4". It is assumed the offsets of the subsequent morphemes "処理", "言語", and "の" are "52", "53", "54".

Processing will be described that sets a flag at rows of morpheme attributes by the index generating unit 150*b* based on the results 30 and 33. The index generating unit 150*b* sets a flag "1" at a position where a row having the morpheme "言語" and columns having the offsets "2" and "53". The index generating unit 150*b* sets a flag "1" at a position where a row having the morpheme "自然" and a column having the offset "1" cross. The index generating unit 150*b* sets a flag "1" at a position where a row having the morpheme "処理" and columns having the offsets "3" and "52" cross. The index generating unit 150*b* sets a flag "1" at a position where a row having the morpheme "において" and a column having the offset "4" cross. The index generating unit 150*b* sets a flag "1" at a position where a row having the morpheme "の" and a column having the offset "54" cross.

Processing will be described that sets a flag at rows of arc attributes by the index generating unit 150*b* based on the results 30 and 33. In the result 30, the node 30*a* and the node 30*b* are connected by an arc <mod> from the node 30*b* to the node 30*a*. The node 30*a* corresponds to the morpheme "自然" at the offset "1". The node 30*b* corresponds to the morpheme "言語" at the offset "2". Therefore, the index generating unit 150*b* sets a flag "1" at a position where a row having "mod starting point" and a column having the offset "2" cross. The index generating unit 150*b* sets a flag "1" at a position where a row having "mod end point" and a column having the offset "1" cross.

In the result 30, the node 30*b* and the node 30*c* are connected by an arc <mod> from the node 30*c* to the node 30*b*. The node 30*b* corresponds to the morpheme "言語" at the offset "2". The node 30*c* corresponds to the morpheme "処理" at the offset "3". Therefore, the index generating unit 150*b* sets a flag "1" at a position where a row having "mod starting point" and a column having the offset "3" cross. The index generating unit 150*b* sets a flag "1" at a position where a row having "mod end point" and a column having the offset "2" cross.

In the result 33, the node 30*b* and the node 30*c* are connected by an arc <mod> from the node 30*b* to the node 30*c*. The node 30*b* corresponds to the morpheme "言語" at the offset "53". The node 30*c* corresponds to the morpheme "処理" at the offset "52". Therefore, the index generating unit 150*b* sets a flag "1" at a position where a row having "mod starting point" and a column having the offset "53" cross. The index generating unit 150*b* sets a flag "1" at a position where a row having "mod end point" and a column having the offset "52" cross.

Processing will be described that sets a flag at rows of span attributes by the index generating unit 150*b* based on the results 30 and 33. In the result 30, the distance (span) between the morphemes "自然" and "言語" in the character string corresponding to the nodes 30*a* and 30*b* connected by the arc <mod> is "1". Therefore, the index generating unit 150*b* sets a flag "1" at positions where a row having span1 and columns having the offsets "1" and "2" cross. The distance (span) between the morphemes "言語" and "処理" in the character string corresponding to the nodes 30*b* and 30*c* connected by the arc <mod> is "1". Therefore, the index generating unit 150*b* sets a flag "1" at positions where a row having span1 and columns having the offsets "2" and "3" cross.

In the result 33, the distance (span) between the morphemes "言語" and "処理" in the character string corresponding to the nodes 30*b* and 30*c* connected by the arc <mod> is "1". Therefore, the index generating unit 150*b* sets a flag "1" at positions where a row having span1 and columns having the offsets "52" and "53" cross.

The index generating unit 150*b* obtains a text data piece stored in the text DB 140*a* and executes the processing described with reference to FIG. 6 to FIG. 11 to generate an index for the obtained text data piece. The index generating unit 150*b* stores a text ID and the index of the text data piece in association in the index table 140*c*. The index generating unit 150*b* repeatedly executes the processing on text data pieces to generate indices.

Referring back to FIG. 1, the semantic attribute giving unit 150*c* is a processing unit that gives a semantic attribute to a query 140*b* designated by a user to generate a semantic attribute given query 140*d*. For example, the semantic attribute given to the query 140*b* corresponds to positions of morphemes included in the query and a semantic attribute between morphemes corresponding to the positions. The semantic attribute giving unit 150*c* stores the semantic attribute given query 140*d* in the storage unit 140.

An example of the processing to be performed by the semantic attribute giving unit 150*c* will be described below. The semantic attribute giving unit 150*c* sequentially executes an identification process on a composite word and an expression analogous to a composite word, a dependency information setting process, and a semantic attribute giving process.

The identification process on a composite word and an expression analogous to a composite word will be described. The semantic attribute giving unit 150*c* performs a morphological analysis on the query 140*b* to divide a character string in the query 140*b* into a plurality of morphemes. The semantic attribute giving unit 150*c* performs sampling on the morphemes to identify a morpheme corresponding to a word in the morphemes acquired from the query 140b.

The semantic attribute giving unit 150c compares the morpheme corresponding to a word identified by the sampling and the dictionary information 140e and thus identifies a morpheme corresponding to a composite word. Then, the semantic attribute giving unit 150c decomposes the identified morpheme corresponding to a composite word into words. For example, the semantic attribute giving unit 150c divides one morpheme "自然言語処理" (natural language processing) corresponding to a composite word into three morphemes "自然", "言語", and "処理".

The semantic attribute giving unit 150c may perform the identification of an expression analogous to a composite word included in the query 140b in the same manner as the index generating unit 150b.

The dependency information setting process will be described. The semantic attribute giving unit 150c performs a semantic analysis on a group of morphemes corresponding to a composite word and a group of morphemes corresponding to an expression analogous to a composite word and gives information regarding a governor and a dependent to nodes corresponding to the morphemes. For example, the dependency relationship acquired in a result of a semantic analysis by the semantic attribute giving unit 150c is the same as that described with reference to FIG. 4 and FIG. 5.

The semantic attribute giving process will be described. The semantic attribute giving unit 150c gives a semantic attribute to the query 140b based on the results of the identification process and the dependency information setting process. The semantic attribute to be given to the query is information corresponding to the index.

The semantic attribute giving unit 150c generates a semantic attribute to be given to a query in the same manner as the index generation described with reference to FIG. 6 to FIG. 11. For example, it is assumed a character string "統計による翻訳" (translation based on statistics) is designated in the query 140b. In this case, the semantic attribute giving unit 150c executes the processing described with reference to FIG. 7 to generate the index 34a and gives the index 34a to the query 140b as a semantic attribute to generate a semantic attribute given query 140d.

Referring back to FIG. 1, the retrieving unit 150d is a processing unit that retrieves a retrieval target text data piece based on the index in the index table 140c and the semantic attribute given query 140d. The retrieving unit 150d outputs information regarding the text data piece that is the retrieval result to the display unit 130. In a case where the query 140b is transmitted from an external terminal apparatus, the retrieving unit 150d transmits information regarding a text data piece that is a retrieval result to the external terminal apparatus.

An example of processing to be performed by the retrieving unit 150d will be described below. The retrieving unit 150d sequentially executes a process that extracts an independent word part, a process that performs conversions for operations, and AND operations. In the description of the retrieving unit 150d, the information regarding semantic attributes given to the semantic attribute given query 140d is called a query bit map. The index generated from a text data piece is called an index bit map.

Figure 12:
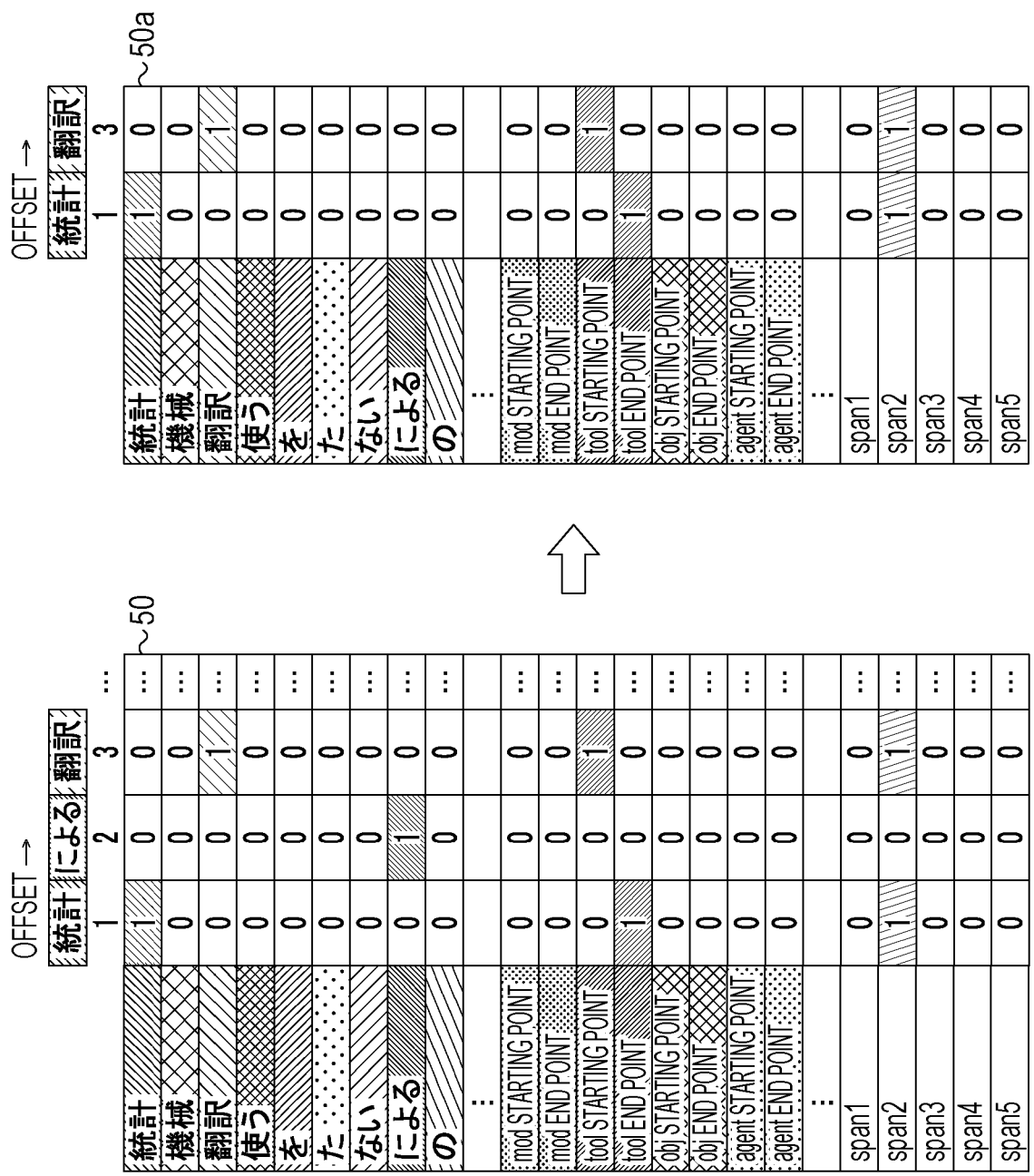
FIG. 12 is a first diagram for explaining a process that extracts an independent word part.
Figure 13:
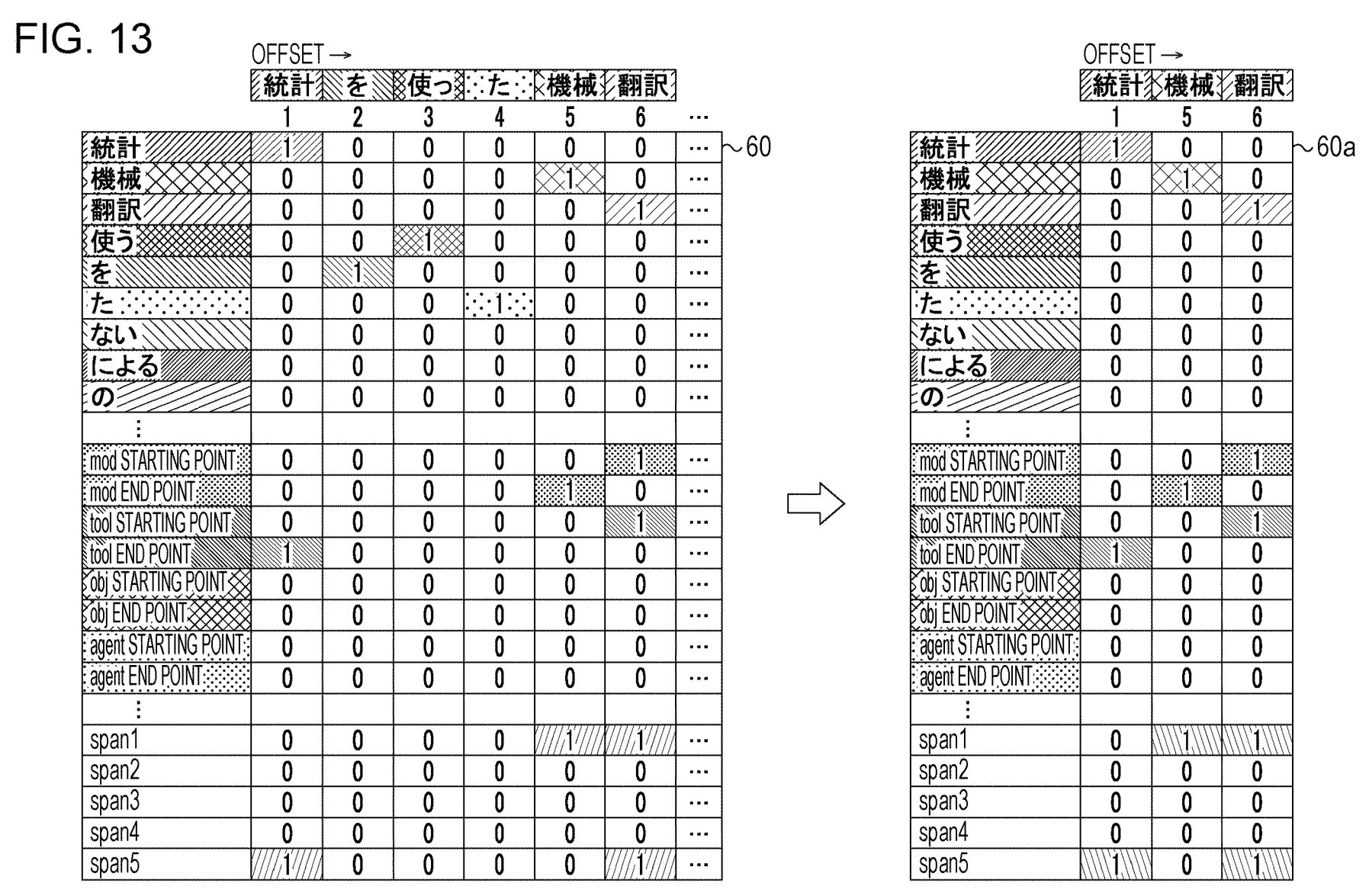

The process that extracts an independent word part will be described. FIG. 12 and FIG. 13 are diagrams for explaining the process that extracts an independent word part. FIG. 12 will be described. A query bit map 50 illustrated in FIG. 12 is a bit map (index) generated from "統計による翻訳" (translation based on statistics) included in a query.

An independent word here is a morpheme having a flag "1" at its attribute part in a plurality of morphemes designated in advance. For example, in the query bit map 50, the morphemes "統計" and "翻訳" have a flag "1" in their attribute parts. It is assumed that the morphemes "統計" and "翻訳" are designated in advance. It is further assumed that the morpheme "による" is not included in a plurality of morphemes designated in advance. The retrieving unit 150d removes the column having the offset "2" in the query bit map 50 to generate a query bit map 50a having the extracted independent word part.

FIG. 13 will be described. An index bit map 60 illustrated in FIG. 13 is a bit map (index) generated from a character string "統計を使った機械翻訳" (machine translation using statistics) included in a text data piece. In the index bit map 60, the morphemes "統計", "機械", and "翻訳" have a flag "1" at their attribute parts. It is assumed that the morphemes "を", "使う", and "た" are not included in the plurality of morphemes designated in advance. The retrieving unit 150d removes columns having the offsets "2" to "4" in the index bit map 60 to generate an index bit map 60a having the extracted independent word part.

Figure 14:
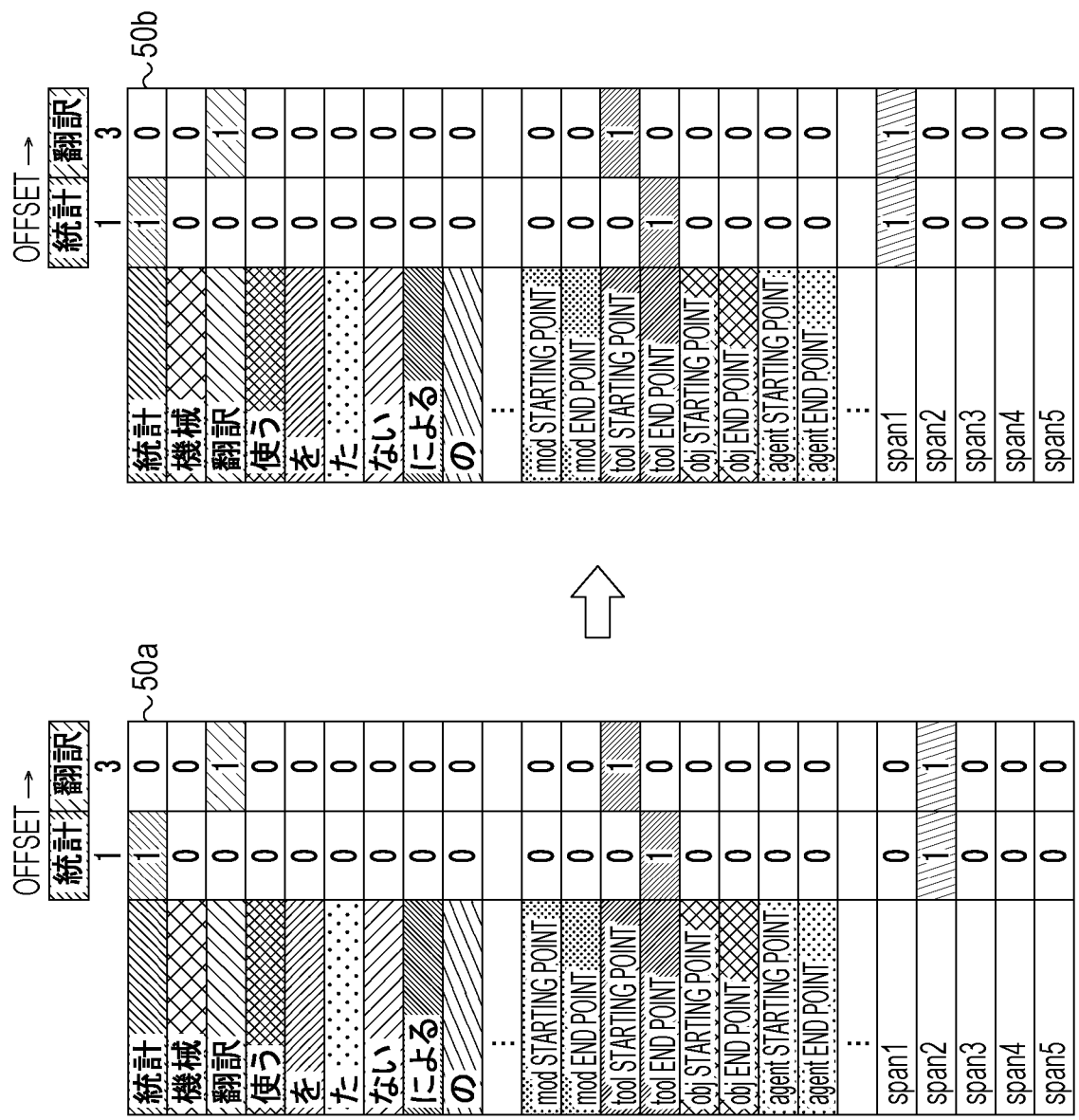
FIG. 14 is a first diagram for explaining a process that performs conversions for operations.
Figure 15:
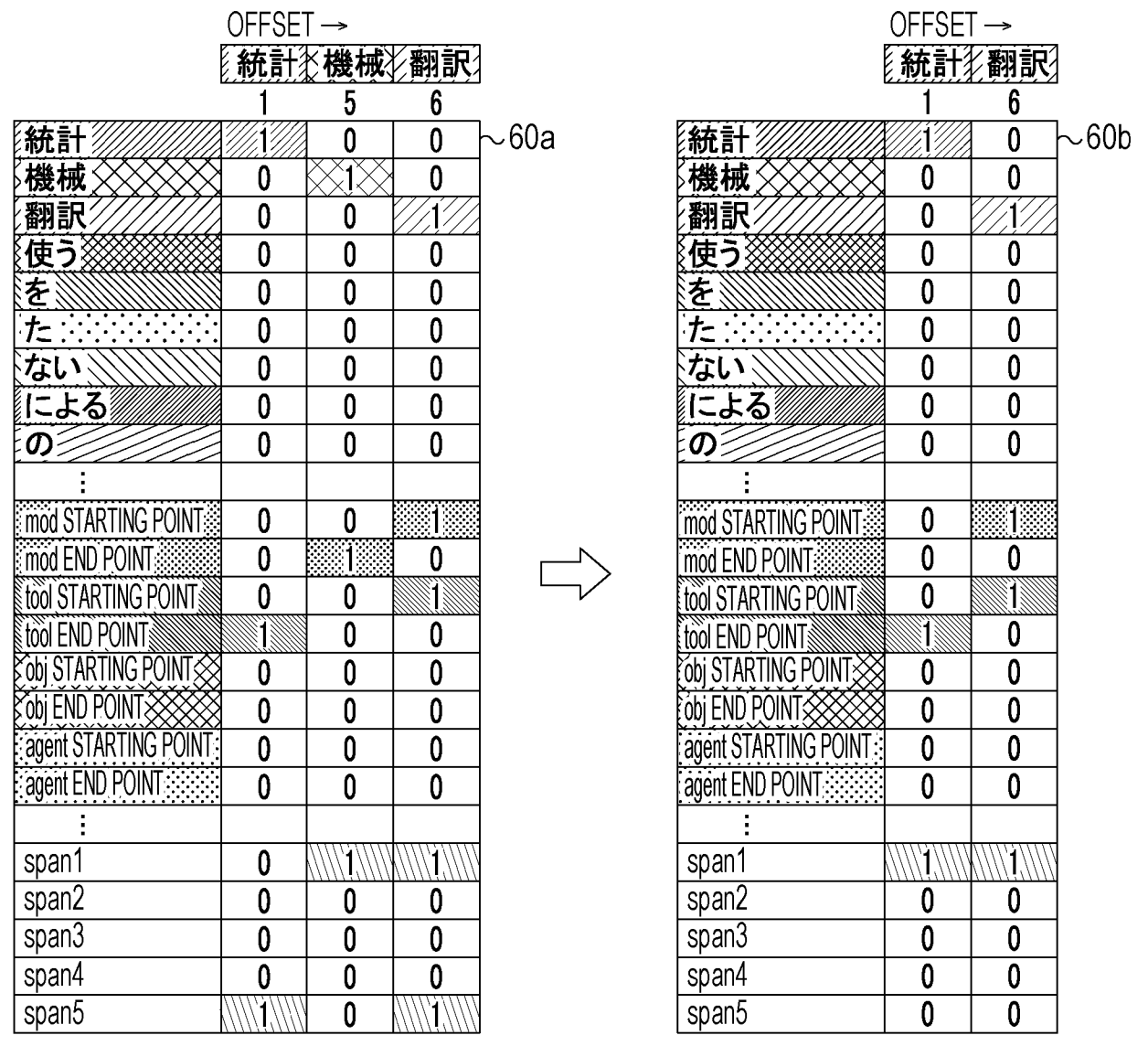

Next, the process that performs conversions for operations will be described. FIG. 14 and FIG. 15 are diagrams for explaining the process that performs conversions for operations. FIG. 14 will be described. The retrieving unit 150d transposes columns such that rows of attributes of the morphemes in the query bit map 50a having the extracted independent word part have a flag "1" in the dictionary order. Because the query bit map 50a has a flag "1" in the dictionary order, it is not changed.

The retrieving unit 150d updates the span attributes in the query bit map 50a. Because information corresponding to "による" is removed from "統計による翻訳" (translation based on statistics) in the query, the span between (or distance between offsets of) the morphemes "統計" and "翻訳" is changed from "span2" to "span1". Therefore, the retrieving unit 150d converts the flags at positions where the row having span1 and columns having the offsets "1" and "3" cross to "1". The retrieving unit 150d converts flags at positions where the row having span2 and columns having the offsets "1" and "3" cross to "0".

The retrieving unit 150d performs this processing for conversion from the query bit map 50a to a query bit map 50b for operations.

FIG. 15 will be described. The retrieving unit 150d sorts the order of the words (morphemes) on the vertical axis in the index bit map 60a having the extracted independent word part so that the words are arranged in the dictionary order. The columns are transposed such that the rows of attributes of the morphemes in the index bit map 60a have a flag "1" in the dictionary order. Because the index bit map 60a has a flag "1" in the dictionary order, it is not changed. Because the query bit map 60b to be compared does not have a flag "1" for the morpheme "機械", the retrieving unit 150d removes the column having the offset "5" in the index bit map 60a.

The retrieving unit 150d updates span attributes in the index bit map 60a. Because information corresponding to "を使った機械" is removed from the text data piece "統計を使った機械翻訳" (machine translation using statistics), the span between (or distance between offsets of) the morphemes "統計" and "翻訳" is changed from "span5" to "span1". Therefore, the retrieving unit 150d converts the flags at positions where the row having span1 and columns having the offsets "1" and "6" cross to "1". The retrieving unit 150d converts flags at positions where the row having span5 and columns having the offsets "1" and "6" cross to "0".

The retrieving unit 150d performs this processing for the conversion from the index bit map 60a to the operation index bit map 60b.

Next, AND operations will be described. The retrieving unit 150d executes AND operations on the operation query bit map and the operation index bit map. When positions having flags "1" for attributes in the query bit map are all "1" in the AND operation result, the retrieving unit 150d determines that the query hits to the source text data piece of the index bit map.

Figure 16:
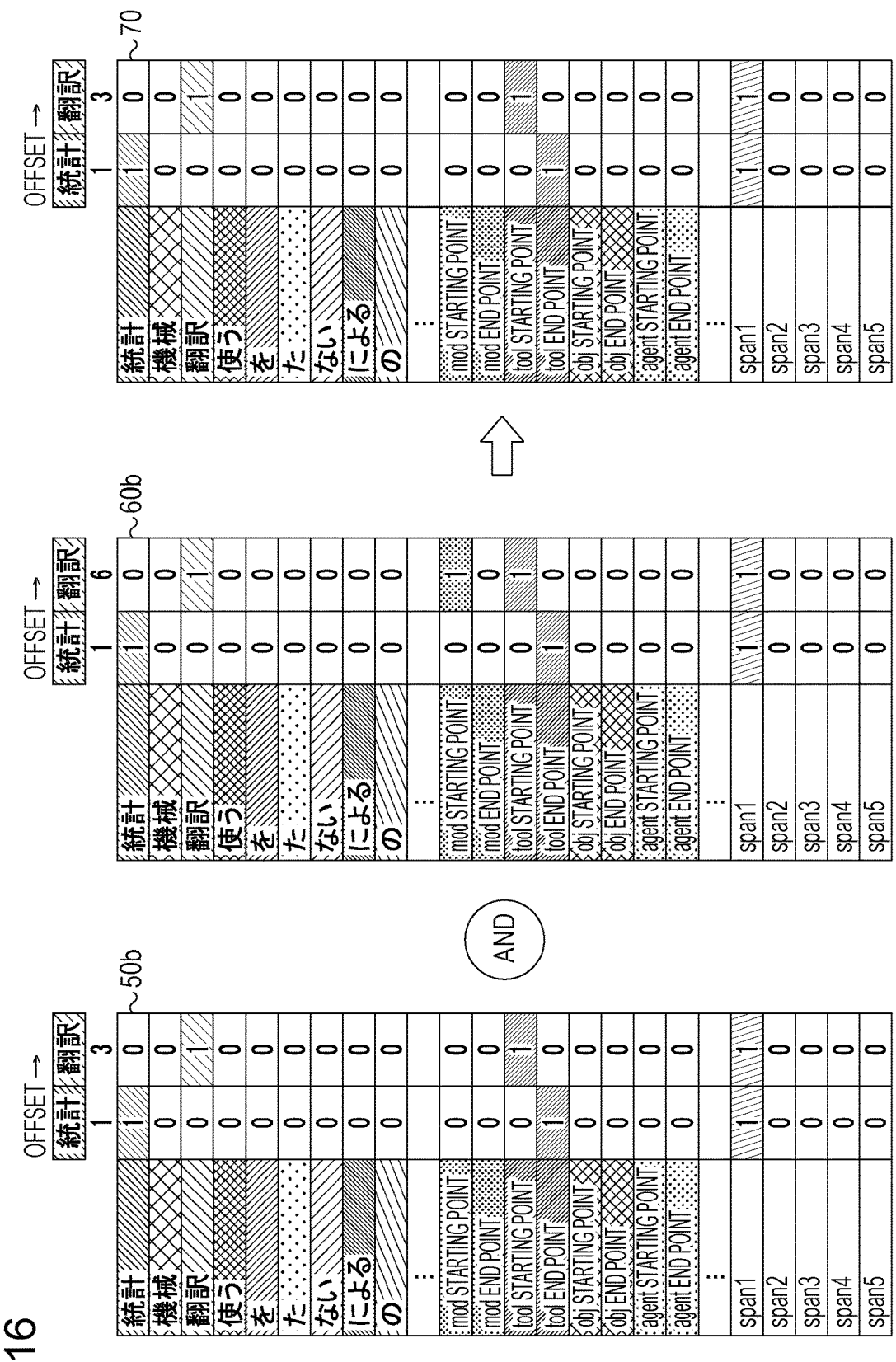
FIG. 16 is a first diagram for explaining an AND operation.

FIG. 16 is a diagram for explaining an AND operation. As illustrated in FIG. 16, execution of AND operations between the query bit map 50b and the index bit map 60b by the retrieving unit 150d produces an AND operation result 70. It is assumed that the retrieving unit 150d performs an AND operation on corresponding pairs of an attribute row and a column thereon.

For example, the retrieving unit 150d executes an AND operation on "統計" row and the first column of the query bit map 50b and "統計" row and the first column of the index bit map 60b to compute a value "1" for the "統計" row and the first column of the AND operation result 70. The retrieving unit 150d executes an AND operation on "翻訳" row and the second column of the query bit map 50b and "翻訳" row and the second column of the index bit map 60b to compute a value "1" for the "翻訳" row and the second column of the AND operation result 70.

The retrieving unit 150d executes an AND operation on "tool starting point" row and the second column of the query bit map 50b and "tool starting point" row and the second column of the index bit map 60b to compute a value "1" for the "tool starting point" row and the second column of the AND operation result 70. The retrieving unit 150d executes an AND operation on "tool end point" row and the first column of the query bit map 50b and "tool end point" row and the first column of the index bit map 60b to compute a value "1" for the "tool end point" row and the first column of the AND operation result 70.

The retrieving unit 150d executes an AND operation on "span1" row and the first column of the query bit map 50b and "span1" row and the first column of the index bit map 60b to compute a value "1" for the "span1" row and the first column of the AND operation result 70. The retrieving unit 150d executes an AND operation on "span1" row and the second column of the query bit map 50b and "span1" row and the second column of the index bit map 60b to compute a value "1" for the "span1" row and the second column of the AND operation result 70.

Comparing between the query bit map 50b and the AND operation result 70, all of positions having a flag "1" for the attributes in the query bit map 50b have a flag "1" in the AND operation result 70. Therefore, the retrieving unit 150d determines that the query "統計による翻訳" (translation based on statistics) hits to the text data piece "統計を使った機械翻訳" (machine translation using statistics). The retrieving unit 150d outputs the information regarding the source text data piece of the index bit map 60b as a retrieval result.

Next, other retrieval examples by the retrieving unit 150d will be described. The following query has the same character string as described above. In other words, for example, the query bit map 50 illustrated in FIG. 12 will also be applied as a query bit map for explaining other examples. The retrieving unit 150d executes the process that extracts an independent word part and the process that performs conversions for operations on the query bit map 50 to generate the query bit map 50b as illustrated in FIG. 14.

Figure 17:
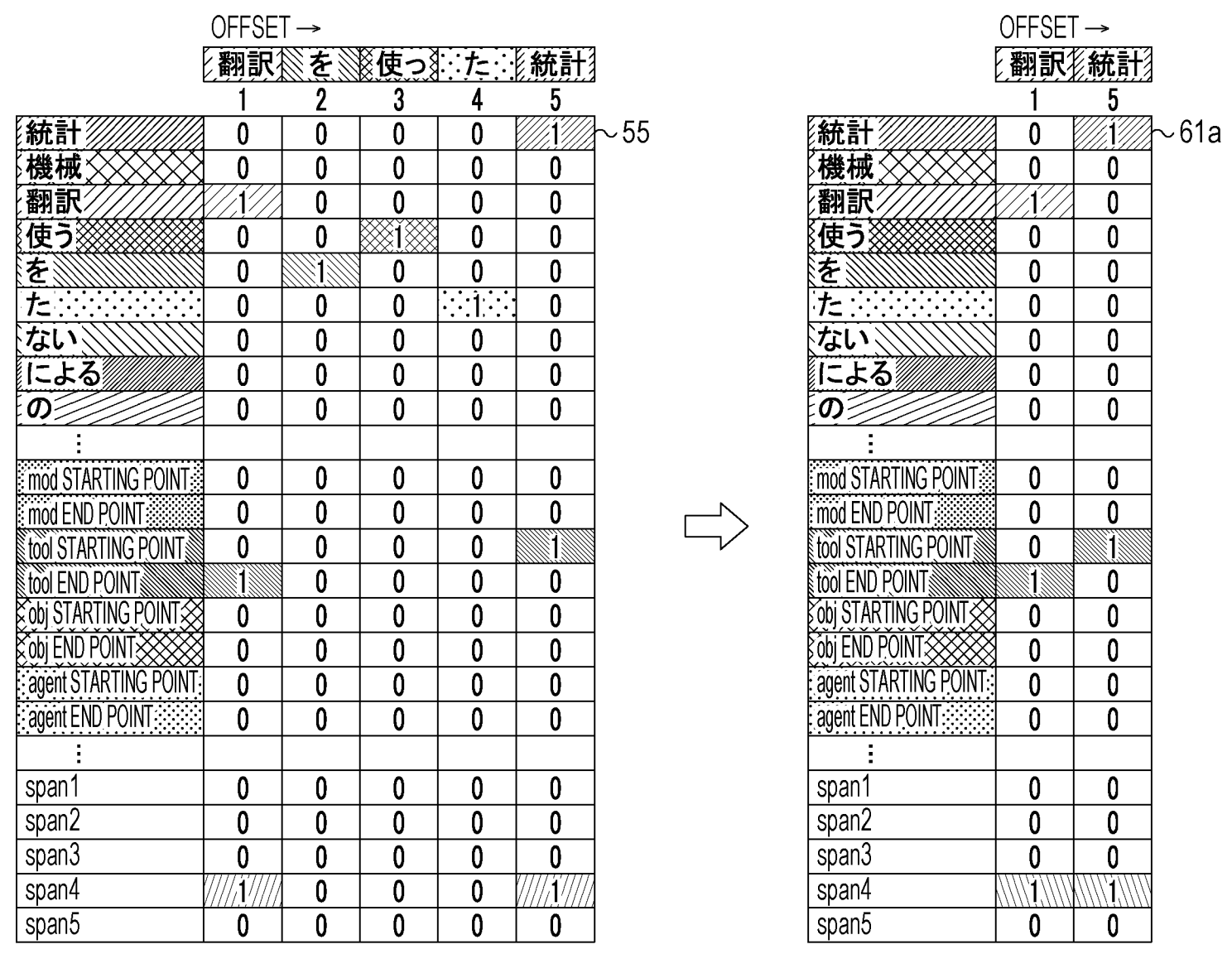

On the other hand, it is assumed that an index bit map generated from a text data piece is an index bit map 55 illustrated in FIG. 17. The index bit map 55 is a bit map (index) generated from a character string "翻訳を使った統計" (statistics using translation) included in the text data piece.

FIG. 17 is a diagram for explaining a process that extracts an independent word part. As illustrated in FIG. 17, the index bit map 55 has a flag "1" at attributes for the morphemes "統計" and "翻訳". It is assumed that the morphemes "統計" and "翻訳" are designated in advance. It is further assumed that the morphemes "を", "使う", and "た" are not included in a plurality of morphemes designated in advance. The retrieving unit 150d removes columns at the offsets "2" to "4" in the index bit map 60 to generate an index bit map 61a having the extracted independent word part.

Figure 18:
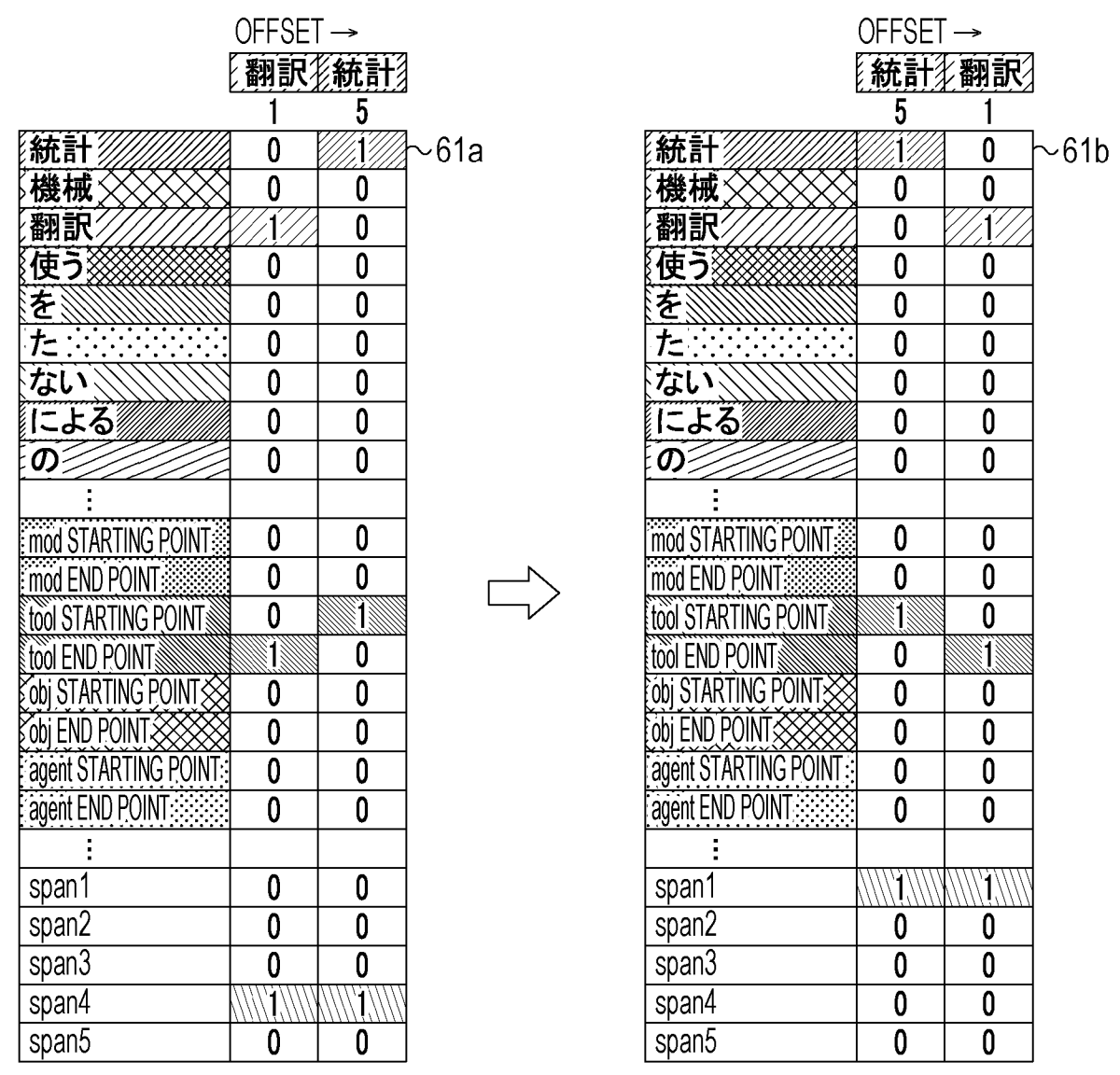

FIG. 18 is a diagram for explaining a process that performs conversions for operations. The retrieving unit 150d transposes columns such that rows of attributes of the morphemes in the index bit map 61a having the extracted independent word part have a flag "1" in the dictionary order. For example, the retrieving unit 150d transposes columns such that rows of attributes of morphemes have a flag "1" at lower positions as the columns go to the right. In the example illustrated in FIG. 18, the row having "翻訳" has a flag "1" at the first column of the index bit map 61a, and the row having "統計" has a flag "1" at the second column. Therefore, the retrieving unit 150d transposes the first column and the second column of the index bit map 61a.

The retrieving unit 150d updates span attributes in the index bit map 61a. Because information corresponding to "を使った" is removed from the text data piece "翻訳を使った統計" (statistics using translation), the span between (or distance between offsets of) the morphemes "翻訳" and "統計" is changed from "span4" to "span1". Therefore, the retrieving unit 150d converts flags at positions where the row having span1 and columns having the offsets "1" and "5" cross to "1". The retrieving unit 150d converts flags at positions where the row having span4 and columns having the offsets "1" and "5" cross to "0".

The retrieving unit 150d performs this processing for the conversions from the index bit map 61a to the index bit map 61b for operations.

Figure 19:
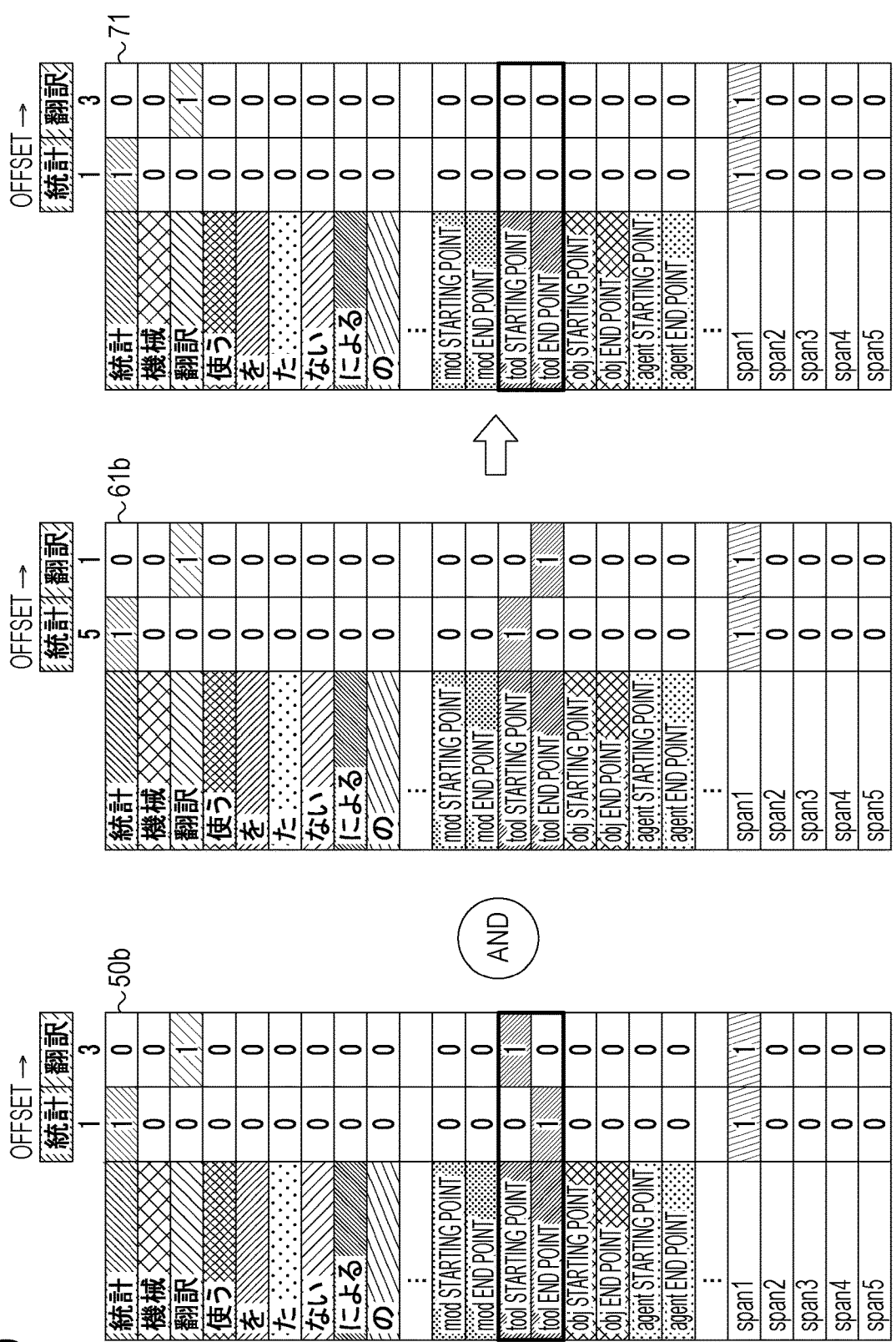
FIG. 19 is a second diagram for explaining an AND operation.

FIG. 19 is a diagram for explaining an AND operation. As illustrated in FIG. 19, execution of an AND operation between the query bit map 50b and the index bit map 61b by the retrieving unit 150d produces an AND operation result 71. It is assumed that the retrieving unit 150d performs an AND operation on corresponding pairs of an attribute row and a column.

For example, the retrieving unit 150d executes an AND operation on "統計" row and the first column of the query bit map 50b and "統計" row and the first column of the index bit map 61b to compute a value "1" for the "統計" row and the first column of the AND operation result 71. The retrieving unit 150d executes an AND operation on "翻訳" row and the second column of the query bit map 50b and "翻訳" row and the second column of the index bit map 61b to compute a value "1" for the "翻訳" row and the second column of the AND operation result 71.

The retrieving unit 150*d* executes an AND operation on "tool starting point" row and the second column of the query bit map 50*b* and "tool starting point" row and the second column of the index bit map 61*b* to compute a value "0" for the "tool starting point" row and the second column of the AND operation result 71. The retrieving unit 150*d* executes an AND operation on "tool end point" row and the first column of the query bit map 50*b* and "tool end point" row and the first column of the index bit map 61*b* to compute a value "0" for the "tool end point" row and the first column of the AND operation result 71.

The retrieving unit 150*d* executes an AND operation on "span1" row and the first column of the query bit map 50*b* and "span1" row and the first column of the index bit map 61*b* to compute a value "1" for the "span1" row and the first column of the AND operation result 71. The retrieving unit 150*d* executes an AND operation on "span1" row and the second column of the query bit map 50*b* and "span1" row and the second column of the index bit map 61*b* to compute a value "1" for the "span1" row and the second column of the AND operation result 71.

Comparing between the query bit map 50*b* and the AND operation result 71, all of positions having a flag "1" for the attributes in the query bit map 50*b* do not have a flag "1" in the AND operation result 70. In the query bit map 50*b*, positions at the "tool starting point" row and the second column and "tool end point" row and the first column have "1". On the other hand, in the AND operation result 71, positions at "tool starting point" row and the second column and "tool end point" row and the first column have "0". Therefore, the retrieving unit 150*d* determines that the query " 統計による翻訳 " (translation based on statistics) does not hit to the text data piece " 翻訳を使っ た統計 " (statistics using translation).

According to the neighborhood retrieval described in FIG. 33, when the degree of neighborhood for the query " 統計による翻訳 " (translation based on statistics) 25 is changed to "5" for a retrieval, the text data piece 26*c* hits which includes " 翻訳を使った統計 " (statistics using translation) that is not to be retrieved. As a result the accuracy of the retrieval decreases. On the other hand, when the query " 統計による翻訳 " (translation based on statistics) is designated in the processing by the retrieving unit 150*d*, the text data piece " 統計を使っ た機械翻訳 " (machine translation using statistics) may be retrieved, and the retrieval of the text data piece " 翻訳を使った統計 " (statistics using translation) may be suppressed. Therefore, the accuracy of the retrieval may be increased.

Although detail descriptions are omitted here, when the retrieving unit 150*d* executes an AND operation on the query bit map of a query " 統計による翻訳 " (translation based on statistics) and the index bit map of a text data piece " 翻訳の統計 " (statistics of translation), the result has "0" at the arc attributes. It means that the query does not hit to the text data piece. When the retrieving unit 150*d* executes an AND operation on a query bit map of the query " 統計による翻訳 " (translation based on statistics) and an index bit map of a text data piece " 統計を使わな い人間翻訳 ", the result has "0" at the arc attributes. It means that the query does not hit to the text data piece. Therefore, retrieval of a text data piece that is not to be retrieved may be suppressed.

Figure 20:
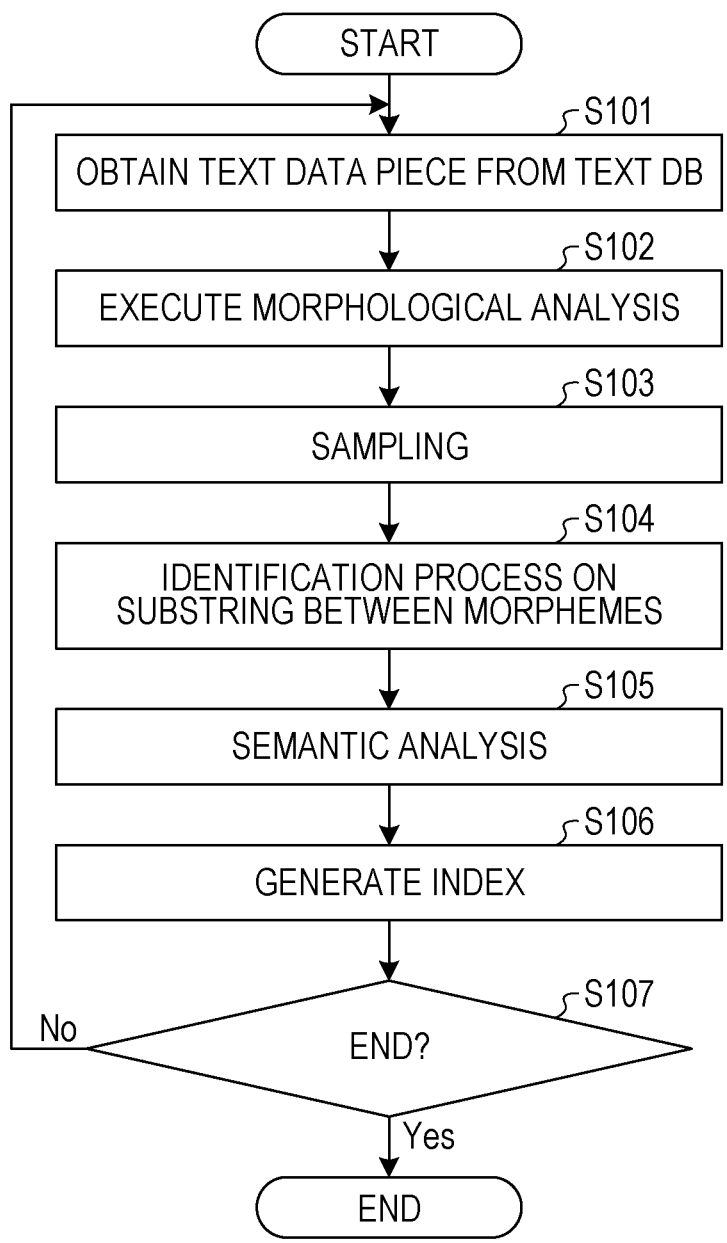
FIG. 20 is a flowchart illustrating a processing procedure that generates an index.

Next, an example of a processing procedure by the retrieval apparatus 100 according to this embodiment will be described. FIG. 20 is a flowchart illustrating processing procedure that generates an index. As illustrated in FIG. 20, the index generating unit 150*b* in the retrieval apparatus 100 obtains a text data piece from the text DB 140*a* (step S101).

The index generating unit 150*b* executes a morphological analysis on the text data piece (step S102). The index generating unit 150*b* executes sampling to determine a morpheme corresponding to a composite word (step S103). The index generating unit 150*b* executes an identification process on a substring between the morphemes (step S104).

The index generating unit 150*b* executes a semantic analysis (or a syntactic analysis) on the text data piece (step S105). The index generating unit 150*b* generates an index based on a result of the semantic analysis (step S106).

If the index generation is to be ended (Yes in step S107), the index generating unit 150*b* ends the process. On the other hand, if the index generation is not to be ended (No in step S107), the index generating unit 150*b* returns to step S101.

Figure 21:
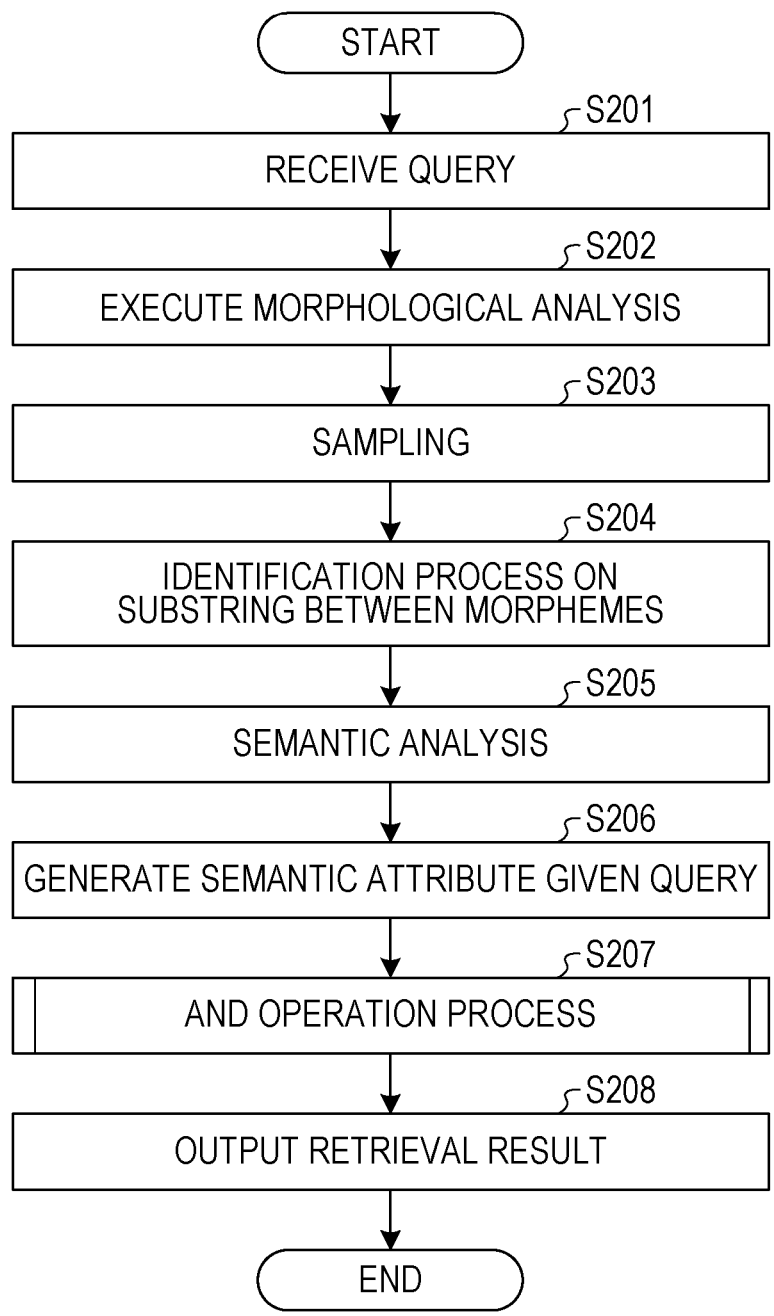
FIG. 21 is a flowchart illustrating a processing procedure for retrieval processing.

FIG. 21 is a flowchart illustrating a processing procedure of a retrieval process. As illustrated in FIG. 21, the obtaining unit 150*a* in the retrieval apparatus 100 receives a query 140*b* (step S201). The semantic attribute giving unit 150*c* in the retrieval apparatus 100 executes a morphological analysis on the query 140*b* (step S202). The semantic attribute giving unit 150*c* executes sampling to determine a morpheme corresponding to a composite word (step S203).

The semantic attribute giving unit 150*c* executes an identification process on a substring between morphemes (step S204). The semantic attribute giving unit 150*c* executes a semantic analysis on the query (step S205), and the semantic attribute giving unit 150*c* generates a semantic attribute given query 140*d* (step S206).

The retrieving unit 150*d* in the retrieval apparatus 100 executes an AND operation process (step S207). The retrieving unit 150*d* outputs a retrieval result to the display unit 130 (step S208).

Figure 22:
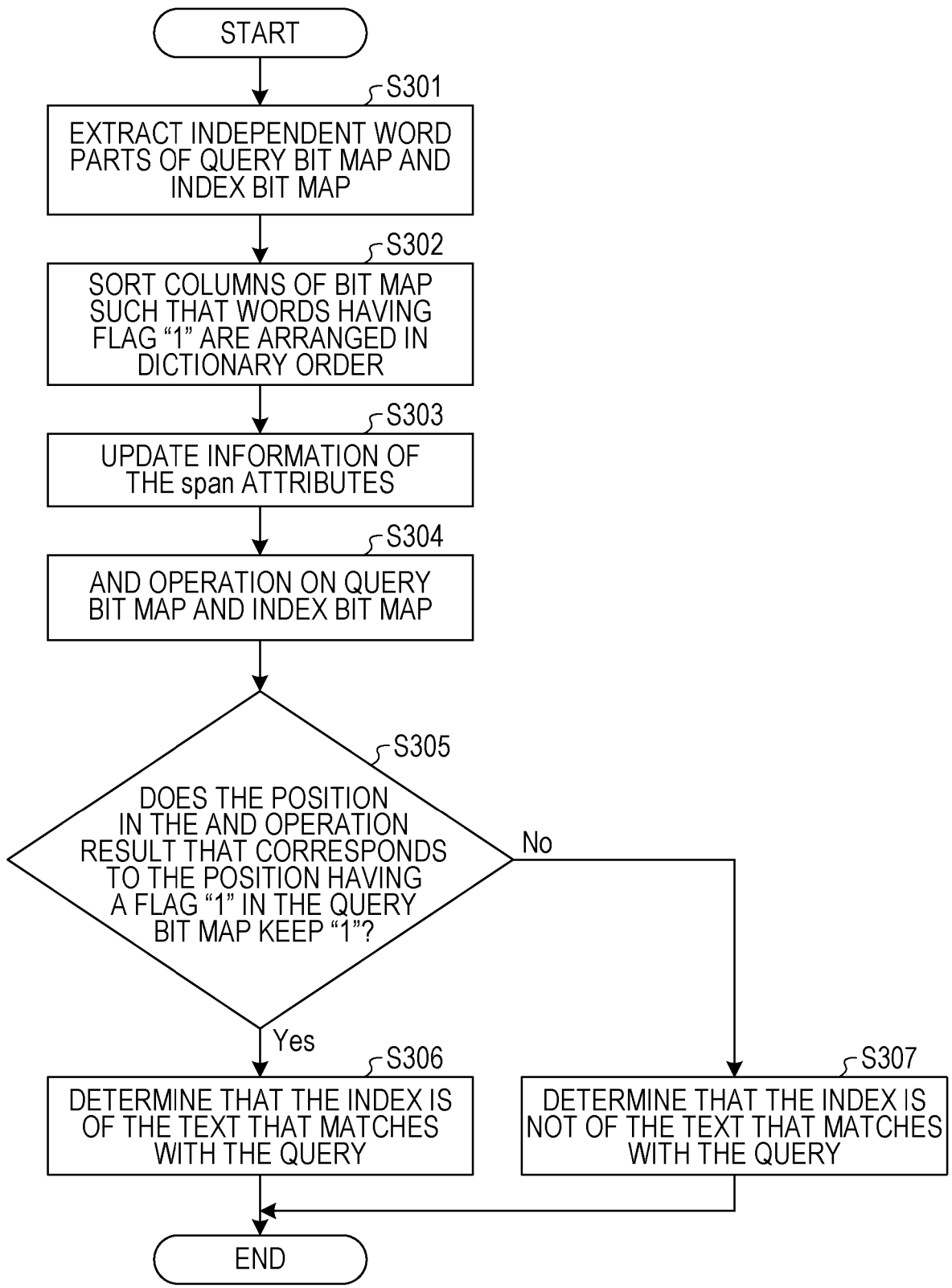
FIG. 22 is a flowchart illustrating a processing procedure for AND operation processing.

Next, a processing procedure of the AND operation process in step S207 in FIG. 21 will be described. FIG. 22 is a flowchart illustrating a processing procedure of the AND operation process. As illustrated in FIG. 22, the retrieving unit 150*d* in the retrieval apparatus 100 extracts an independent word part of the query bit map and the index bit map (step S301).

The retrieving unit 150*d* sorts columns of the bit map such that words having a flag "1" are arranged in the dictionary order (step S302). The retrieving unit 150*d* updates information of the span attributes (step S303). The retrieving unit 150*d* performs an AND operation on the query bit map and the index bit map (step S304).

The retrieving unit 150*d* determines whether the position in the AND operation result that corresponds to the position having a flag "1" in the query bit map keeps "1" or not (step S305). If the position in the AND operation result that corresponds to the position having a flag "1" in the query bit map keeps "1" (Yes in step S305), the retrieving unit 150*d* determines that the index is of the text data piece that matches with the query (step S306).

On the other hand, if the position in the AND operation result that corresponds to the position having a flag "1" in the query bit map does not keep "1" (No in step S305), the retrieving unit 150*d* determines that the index is not of the text data piece that matches with the query (step S307).

Next, effects of the retrieval apparatus 100 according to this embodiment will be described. The retrieval apparatus 100 generates an index including positions of morphemes included in a text data piece and semantic attributes between the morphemes corresponding to the positions. When a query 140*b* is designated, the retrieval apparatus 100 gives positions of morphemes included in the query 140b and semantic attributes between the morphemes corresponding to the positions to the query 140b to generate a semantic attribute given query 140d. The retrieval apparatus 100 executes an AND operation on the index and the semantic attribute given query 140d. In this manner, a text data piece hitting to the query 140b is retrieved from the text DB 140a. For example, while the semantic analysis is being performed, the semantic attribute given query 140d and the index may be generated and undergo an AND operation to determine whether the query 140d hits to the index or not. Therefore, a retrieval considering semantic attributes may be performed by one pass without excessively increasing the size of the index.

The processes performed by the retrieval apparatus 100 are examples, and the retrieval apparatus 100 may perform other processes. Other Processes 1 to 5 to be performed by the retrieval apparatus 100 according to this embodiment will be described below.

Other Process 1 by the retrieval apparatus 100 will be described. The index generating unit 150b in the retrieval apparatus 100 may compress (or hash) an index by using a folding technology to reduce the data amount of the index table 140c.

Figure 23:
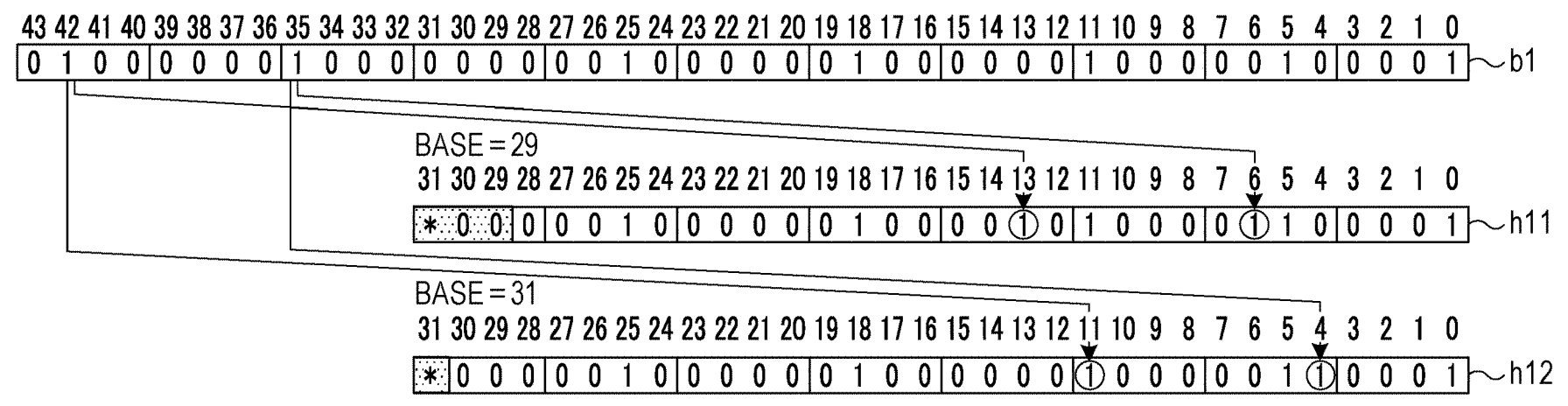

FIG. 23 is a diagram for explaining an example of hashing of an index. A 32-bit register is assumed here, and each bit map is hashed based on hash values (bases) "29" and "31" as an example. A case will be described in which a hashed bit map h11 and a hashed bit map h12 are generated from a bit map b1. The bit map b1 is a bit map acquired by extracting a column of a certain index bit map. The hashed bit map h11 is a bit map hashed by a base "29". The hashed bit map h12 is a bit map hashed by a base "31".

The index generating unit 150b associates a value of a remainder of a division of a position of a bit in the bit map b1 by one base with a position in the hashed bit map. When "1" is set at a position of a bit in the bit map b1, the index generating unit 150b performs a process that sets "1" to the corresponding position of the associated hashed bit map.

An example of a process that generates the hashed bit map h11 by the base "29" from the bit map b1 will be described. First, the index generating unit 150b copies information at positions "0" to "28" in the bit map b1 to the hashed bit map h11. Next, because the remainder of a division of the bit position "35" in the bit map b1 by the base "29" is "6", the position "35" in the bit map b1 is associated with the position "6" in the hashed bit map h11. Because "1" is set at the position "35" in the bit map b1, the index generating unit 150b sets "1" at the position "6" in the hashed bit map h11.

Because the remainder of a division of a bit position "42" in the bit map b1 by the base "29" is "13", the position "42" in the bit map b1 is associated with the position "13" in the hashed bit map h11. Because "1" is set at the position "42" in the bit map b1, the index generating unit 150b sets "1" at a position "13" in the hashed bit map h11.

The index generating unit 150b repeatedly executes this processing on positions equal to or higher than the position "29" in the bit map b1 to generate the hashed bit map h11.

An example of a process that generates the hashed bit map h12 by the base "31" from the bit map b1 will be described. First, the index generating unit 150b copies information at positions "0" to "30" in the bit map b1 to the hashed bit map h12. Next, because the remainder of a division of the bit position "35" in the bit map b1 by the base "31" is "4", the position "35" in the bit map b1 is associated with the position "4" in the hashed bit map h12. Because "1" is set at the position "35" in the bit map b1, the index generating unit 150b sets "1" at the position "4" in the hashed bit map h12.

Because the remainder of a division of a bit position "42" in the bit map b1 by the base "31" is "11", the position "42" in the bit map b1 is associated with the position "11" in the hashed bit map h12. Because "1" is set at the position "42" in the bit map b1, the index generating unit 150b sets "1" at a position "13" in the hashed bit map h12.

The index generating unit 150b repeatedly executes this processing on positions equal to or higher than the position "31" in the bit map b1 to generate the hashed bit map h12.

The index generating unit 150b performs the compression based on the folding technology on each column (or each row) in an index bit map so that the data amount of the index table 140c is reduced.

Next, an example of a process that reconstructs an index bit map from the compressed index bit map by the index generating unit 150b will be described. In order for the retrieving unit 150d according to this embodiment to perform a retrieval process, the index generating unit 150b reconstructs an index bit map from the compressed index bit map. The retrieving unit 150d uses the decompressed index bit maps to retrieve a text data piece corresponding to a query 140b.

Figure 24:
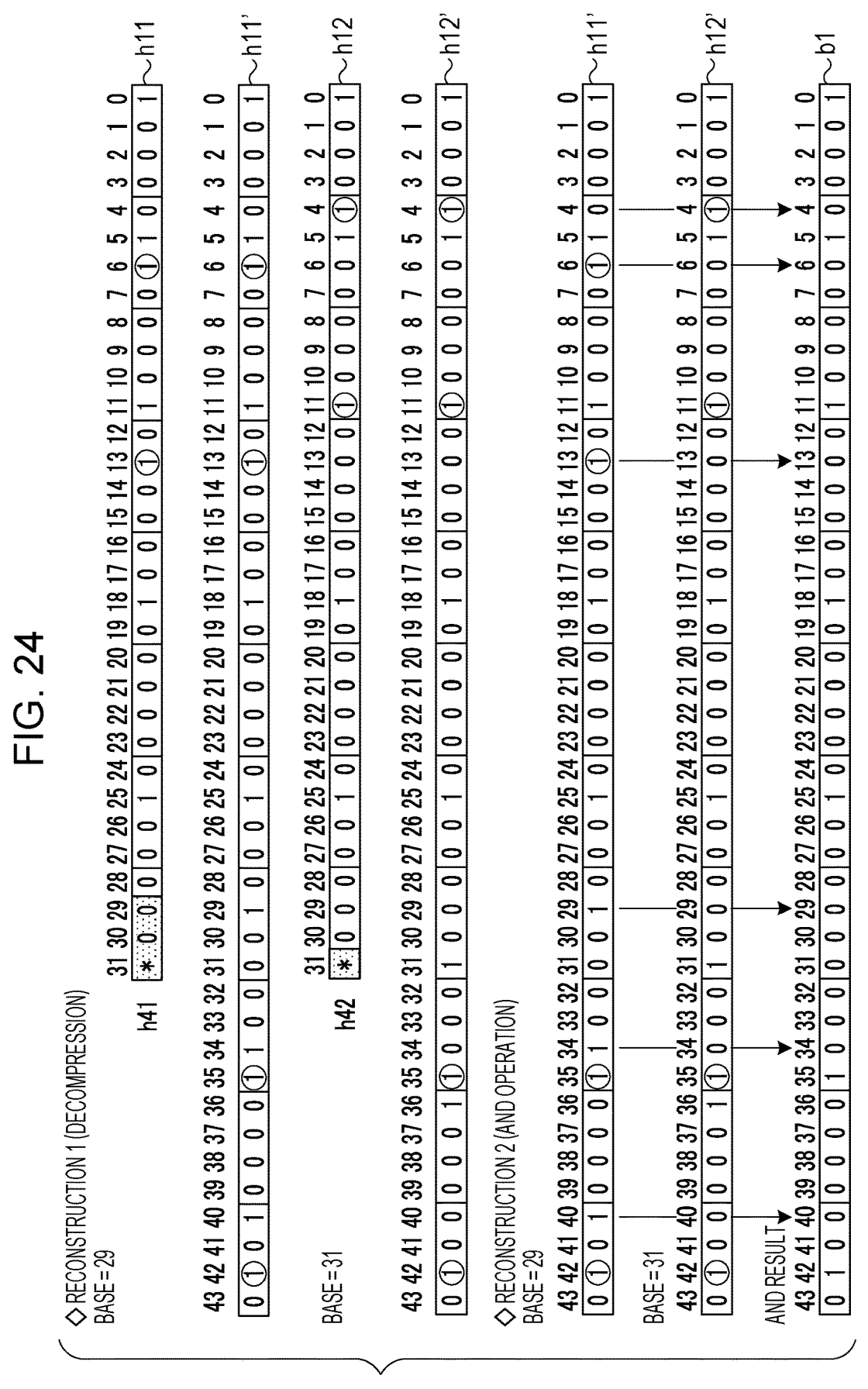

FIG. 24 is a diagram illustrating an example of processing that reconstructs an index from a hashed index. As an example, a case will be described in which the bit map b1 is reconstructed based on the hashed bit map h11 and the hashed bit map h12.

The index generating unit 150b generates an intermediate bit map h11' from the hashed bit map h11 by the base "29". The index generating unit 150b copies values at positions "0" to "28" in the hashed bit map h11 to the positions "0" to "28" in the intermediate bit map h11'.

The index generating unit 150b repeatedly performs the process that copies the values at the positions "0" to "28" in the hashed bit map h11 every "29" to values at and subsequent to the position "29" in the intermediate bit map h11'. In the example illustrated in FIG. 24, values at positions "0" to "14" in the hashed bit map h11 are copied to the positions "29" to "43" in the intermediate bit map h11'.

The index generating unit 150b generates an intermediate bit map h12' from the hashed bit map h12 by the base "31". The index generating unit 150b copies values at positions "0" to "30" in the hashed bit map h12 to the positions "0" to "30" in the intermediate bit map h12', respectively.

The index generating unit 150b repeats the process that copies the values at the positions "0" to "30" in the hashed bit map h12 every "31" to values at and subsequent to the position "31" in the intermediate bit map h12'. In the example illustrated in FIG. 24, values at positions "0" to "12" in the hashed bit map h12 are copied to the positions "31" to "43" in the intermediate bit map h12'.

After generating the intermediate bit map h11' and the intermediate bit map h12', the index generating unit 150b executes an AND operation on the intermediate bit map h11' and the intermediate bit map h12' so that the bit map b1 before the hashing is reconstructed. The index generating unit 150b may reconstruct indices of text data pieces by repeating the same processing on other hashed bit maps.

Other Process 2 by the retrieval apparatus 100 will be described. The retrieving unit 150d in the retrieval apparatus 100 executes an AND operation on a query bit map and an index bit map to detect an index that hits to the query 140b, as described with reference to FIG. 12 to FIG. 19 and so on. However, embodiments are not limited thereto. For example, the retrieving unit 150d may also determine and output a similarity in addition to the information on whether an index hits to the query 140b or not.

In addition to the processing described with reference to FIG. 12 to FIG. 19, the retrieving unit 150d compares words included in a query and words in a text data piece, calculates the number of matching words, and outputs the calculated number of matching words as a similarity. For example, in a case where the query 140b has a character string "統計による翻訳" (translation based on statistics) and the text data piece has a character string "統計を使った機械翻訳" (machine translation using statistics), because words "統計" and "翻訳" are matching words (morphemes), the similarity is "2".

For example, in a case where the query 140b has a character string "統計による機械翻訳 (machine translation based on statistics)" and the text data piece has a character string "統計を使った機械翻訳" (machine translation using statistics), because words "統計", "機械", and "翻訳" are matching words (morphemes), the similarity is "3".

The retrieving unit 150d outputs information regarding text data pieces hitting to the query 140b and information regarding the similarity. Thus, in a case where a plurality of text data pieces hit to a query, a user may easily narrow text data pieces to be retrieved with reference to the similarities.

Other Process 3 by the retrieval apparatus 100 will be described. For example, cases such as the following Case A and Case B will be described in which a similarity between a certain query and a certain text data piece is computed.

Case A: A query "統計による翻訳" (translation based on statistics) is used to retrieve a text data piece "統計を使った機械翻訳" (machine translation using statistics).

Case B: A query "統計による機械翻訳" (automatic translation based on statistics) is used to retrieve a text data piece "統計を使った機械翻訳" (machine translation using statistics).

Directly calculating similarities as in Other Process 2, Case A has a similarity of "2", and Case B has a similarity of "2". Here, "自動" (automatic) in the composite word "自動翻訳" and "機械" (machine) in the composite word "機械翻訳" have substantially the same meaning. Accordingly, the retrieving unit 150d in the retrieval apparatus may compute a similarity by assuming that predetermined words included in composite words are identical. For example, the retrieving unit 150d may assume that, in Case B, "自動" in the composite word "自動翻訳" and "機械" in the composite word "機械翻訳" agree with each other and may determine that the similarity in Case B is "3".

Having described that the index generating unit 150b in the retrieval apparatus 100 generates an index of a text data piece by allocating one morpheme to one row on the vertical axis, embodiments are not limited thereto. A plurality of morphemes having an "or" relationship therebetween may be allocated to one row.

Figure 25:
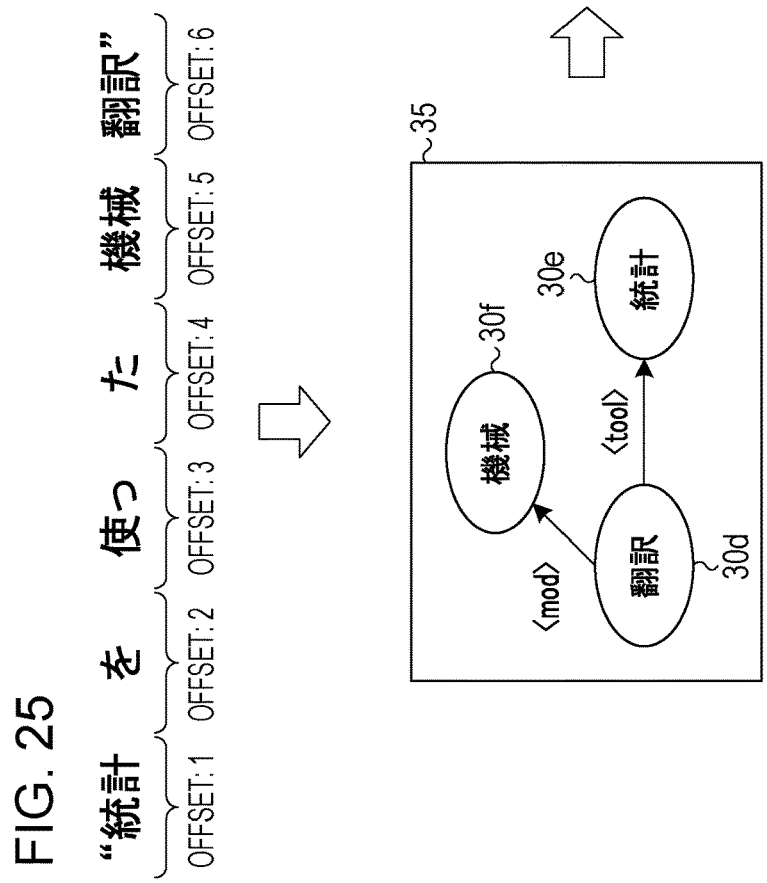
FIG. 25 is a diagram illustrating an example of another data structure of an index.

FIG. 25 is a diagram illustrating an example of another data structure of an index. FIG. 25 illustrates an index 45 corresponding to a character string "機械た機械翻訳 (machine translation using statistics)". Comparing with the index 35a described with reference to FIG. 6, the index 45 has "機械" or "自動" as a morpheme attribute at the second row. The index 45 has a flag "1" at an offset position for the character string "機械" or "自動".

Other Process 4 by the retrieval apparatus 100 will be described. Having described that the aforementioned technology is applied to cases where queries and text data pieces are Japanese, the technology is also applicable to English to retrieve a text data piece corresponding to a query.

Figure 26:
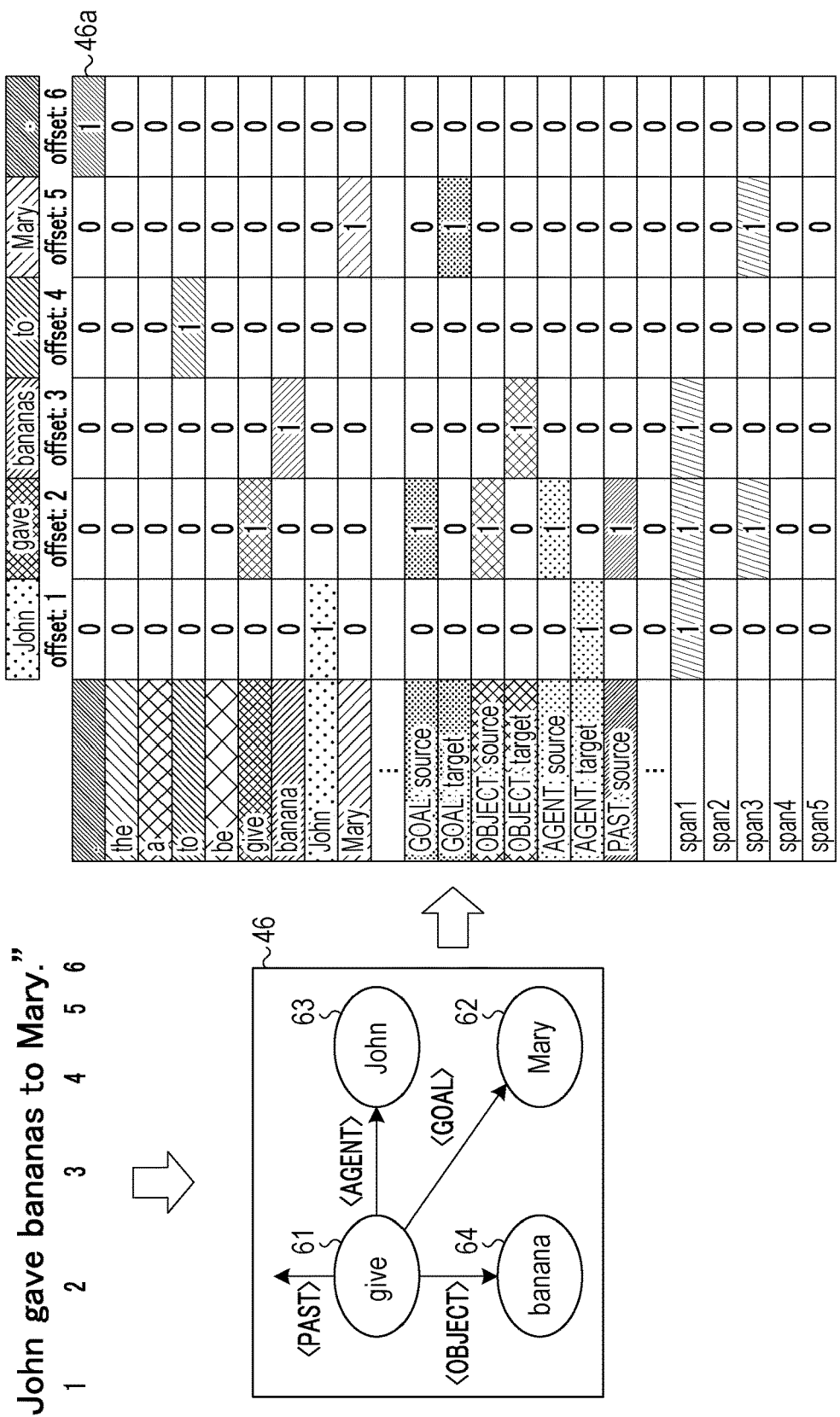
FIG. 26 is a first diagram illustrating an example of processing that generates an index of English text.
Figure 27:
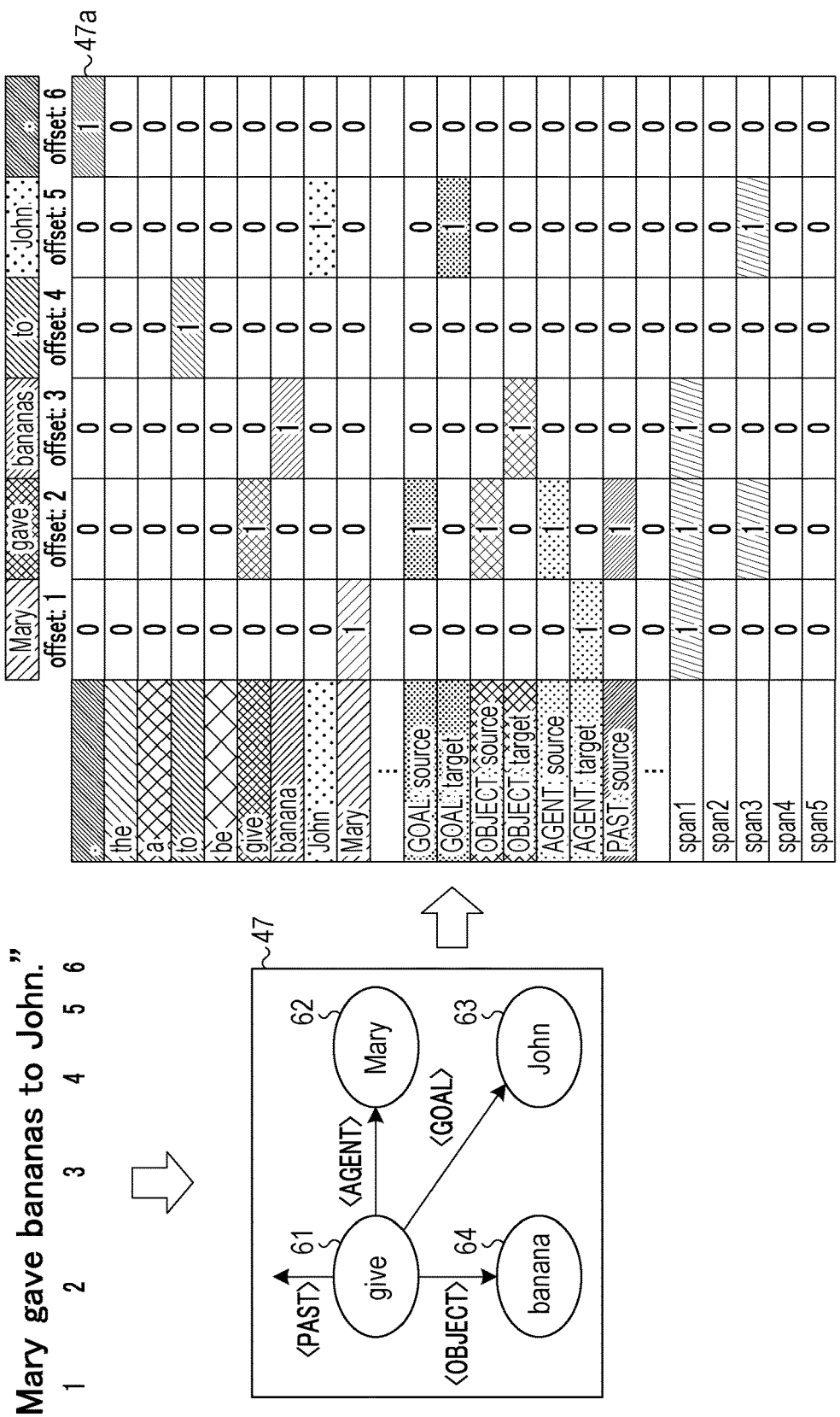
FIG. 27 is a second diagram illustrating an example of processing that generates an index of English text.

FIG. 26 and FIG. 27 are diagrams illustrating examples of processing that generates an index of an English text data piece. With reference to FIG. 26, a case will be described in which an index 46a for a text data piece (character string) "John gave bananas to Mary." is to be generated. The offsets of the words and the period are "1", "2", "3", "4", "5", "6".

The index generating unit 150b executes a semantic analysis on the character string "John gave bananas to Mary." to produce a result 46. For example, a node 61 corresponds to "give" (the base form of "gave"). A node 62 corresponds to "Mary". A node 63 corresponds to "John". A node 64 corresponds to "banana" (the singular form of "bananas").

As indicated in the result 46, in the semantic analysis, the node 61 and the node 64 are connected by an arc <OBJECT> from the node 61 to the node 64. The node 61 and the node 62 are connected by an arc <GOAL> from the node 61 to the node 62. The node 61 and the node 63 are connected by an arc <AGENT> from the node 61 to the node 63. The node 61 is connected to an arc <PAST> where the node 61 is a governor.

Processing will be described that sets a flag at rows of morpheme attributes in the index 46a by the index generating unit 150b. The index generating unit 150b sets a flag "1" at a position where a row having the morpheme "." (period) and a column having the offset "6" cross. The index generating unit 150b sets a flag "1" at a position where a row having the morpheme "to" and a column having the offset "4" cross. The index generating unit 150b sets a flag "1" at a position where a row having the morpheme "give" and a column having the offset "2" cross. The index generating unit 150b sets a flag "1" at a position where a row having the morpheme "banana" and a column having the offset "3" cross. The index generating unit 150b sets a flag "1" at a position where a row having the morpheme "John" and a column having the offset "1" cross. The index generating unit 150b sets a flag "1" at a position where a row having the morpheme "Mary" and a column having the offset "5" cross.

Processing will be described that sets a flag at rows of arc attributes in the index 46a by the index generating unit 150b. In the result 46, the node 61 and the node 62 are connected by an arc <GOAL> from the node 61 to the node 62. The node 61 corresponds to the morpheme "give" at the offset "2". The node 62 corresponds to the morpheme "Mary" at the offset "5". Therefore, the index generating unit 150b sets a flag "1" at a position where a row having "GOAL: source" and a column having the offset "2" cross. The index generating unit 150b sets a flag "1" at a position where a row having "GOAL: target" and a column having the offset "5" cross.

In the result 46, the node 61 and the node 64 are connected by an arc <OBJECT> from the node 61 to the node 64. The node 61 corresponds to the morpheme "give" at the offset "2". The node 64 corresponds to the morpheme "banana" at the offset "3". Therefore, the index generating unit 150b sets a flag "1" at a position where a row having "OBJECT: source" and a column having the offset "2" cross. The index generating unit 150*b* sets a flag "1" at a position where a row having "OBJECT: target" and a column having the offset "3" cross.

In the result 46, the node 61 and the node 63 are connected by an arc <AGENT> from the node 61 to the node 63. The node 61 corresponds to the morpheme "give" at the offset "2". The node 63 corresponds to the morpheme "John" at the offset "1". Therefore, the index generating unit 150*b* sets a flag "1" at a position where a row having "AGENT: source" and a column having the offset "2" cross. The index generating unit 150*b* sets a flag "1" at a position where a row having "AGENT: target" and a column having the offset "1" cross.

In the result 46, an arc <PAST> is connected to the node 61. The node 61 corresponds to the morpheme "give" at the offset 2. Therefore, the index generating unit 150*b* sets a flag "1" at a position where a row having "PAST: source" and a column having the offset "2" cross.

Processing will be described that sets a flag at rows of span attributes in the index 46*a* by the index generating unit 150*b*. The distance (span) between the morphemes "give" and "John" in the character string corresponding to the nodes 61 and 63 connected by the arc <AGENT> is "1". Therefore, the index generating unit 150*b* sets a flag "1" at positions where a row having span1 and columns having offsets "1" and "2" cross. Description regarding other processes that set flags at rows having span attributes by the index generating unit 150*b* will be omitted.

FIG. 27 will be described. With reference to FIG. 27, a case will be described in which an index 47*a* for a character string "Mary gave bananas to John." is to be generated. The offsets of the words and the period are "1", "2", "3", "4", "5", "6".

The index generating unit 150*b* executes a semantic analysis on the character string "Mary gave bananas to John." to produce a result 47. As indicated in the result 47, the node 61 and the node 64 are connected by an arc <OBJECT> from the node 61 to the node 64. The node 61 and the node 63 are connected by an arc <GOAL> from the node 61 to the node 63. The node 61 and the node 62 are connected by an arc <AGENT> from the node 61 to the node 62. The node 61 is connected to an arc <PAST> where the node 61 is a governor.

Processing will be described that sets a flag at rows of morpheme attributes in the index 47*a* by the index generating unit 150*b*. The index generating unit 150*b* sets a flag "1" at a position where a row having the morpheme "." (period) and a column having the offset "6" cross. The index generating unit 150*b* sets a flag "1" at a position where a row having the morpheme "to" and a column having the offset "4" cross. The index generating unit 150*b* sets a flag "1" at a position where a row having the morpheme "give" and a column having the offset "2" cross. The index generating unit 150*b* sets a flag "1" at a position where a row having the morpheme "banana" and a column having the offset "3" cross. The index generating unit 150*b* sets a flag "1" at a position where a row having the morpheme "John" and a column having the offset "5" cross. The index generating unit 150*b* sets a flag "1" at a position where a row having the morpheme "Mary" and a column having the offset "1" cross.

Processing will be described that sets a flag at rows of arc attributes in the index 47*a* by the index generating unit 150*b*. In the result 47, the node 61 and the node 63 are connected by an arc <GOAL> from the node 61 to the node 63. The node 61 corresponds to the morpheme "give" at the offset "2". The node 63 corresponds to the morpheme "John" at the offset "5". Therefore, the index generating unit 150*b* sets a flag "1" at a position where a row having "GOAL: source" and a column having the offset "2" cross. The index generating unit 150*b* sets a flag "1" at a position where a row having "GOAL: target" and a column having the offset "5" cross.

In the result 47, the node 61 and the node 64 are connected by an arc <OBJECT> from the node 61 to the node 64. The node 61 corresponds to the morpheme "give" at the offset "2". The node 64 corresponds to the morpheme "banana" at the offset "3". Therefore, the index generating unit 150*b* sets a flag "1" at a position where a row having "OBJECT: source" and a column having the offset "2" cross. The index generating unit 150*b* sets a flag "1" at a position where a row having "OBJECT: target" and a column having the offset "3" cross.

In the result 47, the node 61 and the node 62 are connected by an arc <AGENT> from the node 61 to the node 62. The node 61 corresponds to the morpheme "give" at the offset 2. The node 62 corresponds to the morpheme "Mary" at the offset "1". Therefore, the index generating unit 150*b* sets a flag "1" at a position where a row having "AGENT: source" and a column having the offset "2" cross. The index generating unit 150*b* sets a flag "1" at a position where a row having "AGENT: target" and a column having the offset "1" cross.

In the result 47, an arc <PAST> is connected to the node 61. The node 61 corresponds to the morpheme "give" at the offset "2". Therefore, the index generating unit 150*b* sets a flag "1" at a position where a row having "PAST: source" and a column having the offset "2" cross.

Processing will be described that sets a flag at rows of span attributes in the index 47*a* by the index generating unit 150*b*. The distance (span) between the morphemes "give" and "Mary" in the character string corresponding to the nodes 61 and 62 connected by the arc <AGENT> is "1". Therefore, the index generating unit 150*b* sets a flag "1" at positions where a row having span1 and column having offsets "1" and "2" cross. Description regarding other processes that set flags at rows having span attributes by the index generating unit 150*b* will be omitted.

Figure 28:
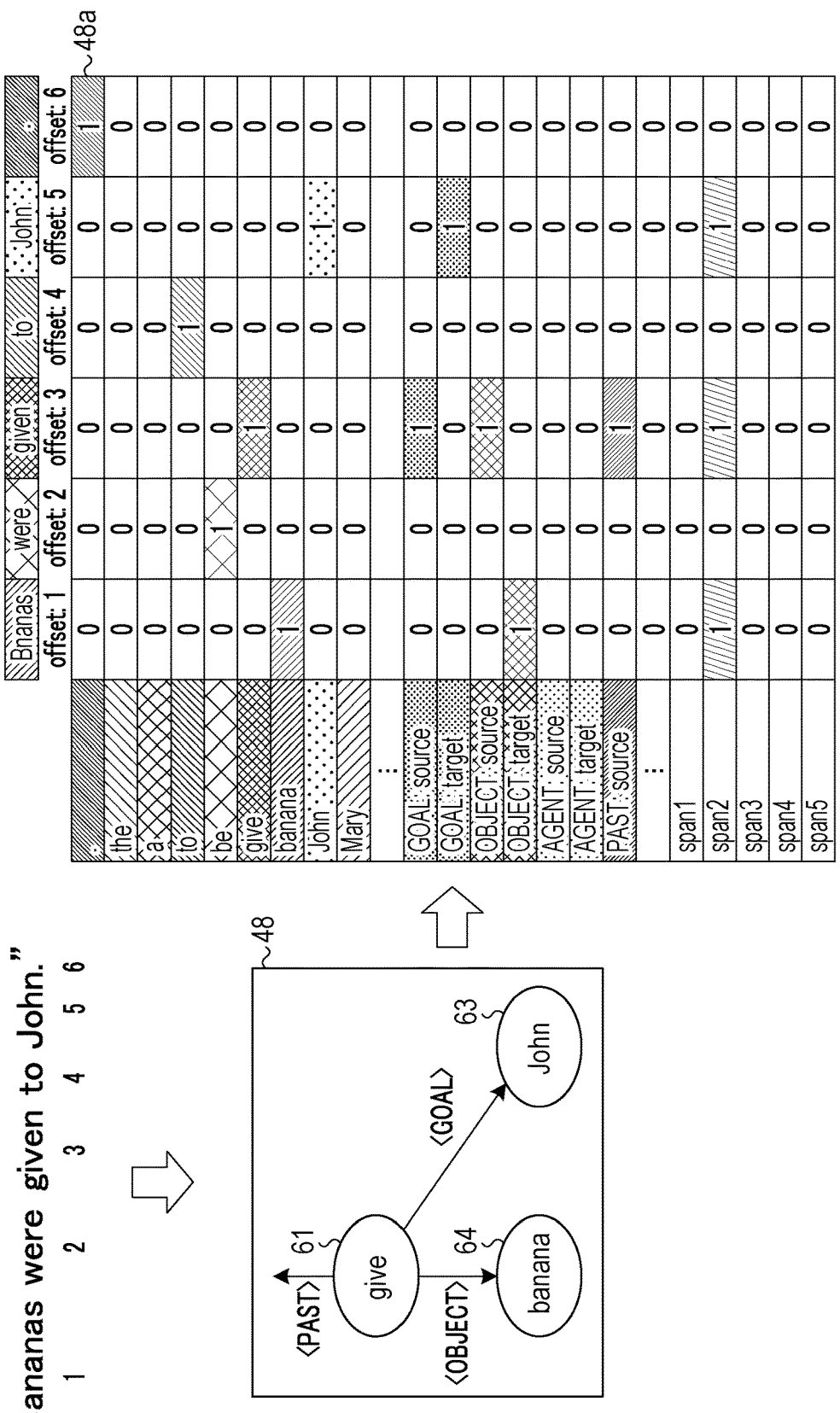
FIG. 28 is a diagram illustrating an example of processing that generates an index for an English query.

FIG. 28 is a diagram illustrating an example of processing that generates an index for an English query. An index for a query is information corresponding to semantic attributes to be given to the query. With reference to FIG. 28, a case will be described in which an index 48*a* for a query (character string) "Bananas were given to John." is to be generated. The offsets of the words and the period are "1", "2", "3", "4", "5", "6".

The semantic attribute giving unit 150*c* executes a semantic analysis on the character string "Bananas were given to John." to produce a result 48. As indicated in the result 48, the node 61 and the node 64 are connected by an arc <OBJECT> from the node 61 to the node 64. The node 61 and the node 63 are connected by an arc <GOAL> from the node 61 to the node 63.

Processing will be described that sets a flag at rows of morpheme attributes in the index 48*a* by the semantic attribute giving unit 150*c*. The semantic attribute giving unit 150*c* sets a flag "1" at a position where a row having the morpheme "." (period) and a column having the offset "6" cross. The semantic attribute giving unit 150*c* sets a flag "1" at a position where a row having the morpheme "to" and a column having the offset "4" cross. The semantic attribute giving unit 150*c* sets a flag "1" at a position where a row having the morpheme "give" and a column having the offset "3" cross. The semantic attribute giving unit 150*c* sets a flag "1" at a position where a row having the morpheme "banana" and a column having the offset "1" cross. The semantic attribute giving unit 150c sets a flag "1" at a position where a row having the morpheme "John" and a column having the offset "5" cross.

Processing will be described that sets a flag at rows of arc attributes in the index 48a by the semantic attribute giving unit 150c. In the result 48, the node 61 and the node 63 are connected by an arc <GOAL> from the node 61 to the node 63. The node 61 corresponds to the morpheme "give" at the offset "3". The node 63 corresponds to the morpheme "John" at the offset "5". Therefore, the index generating unit 150b sets a flag "1" at a position where a row having "GOAL: source" and a column having the offset "3" cross. The index generating unit 150b sets a flag "1" at a position where a row having "GOAL: target" and a column having the offset "5" cross.

In the result 48, the node 61 and the node 64 are connected by an arc <OBJECT> from the node 61 to the node 64. The node 61 corresponds to the morpheme "give" at the offset "3". The node 64 corresponds to the morpheme "banana" at the offset "1". Therefore, the semantic attribute giving unit 150c sets a flag "1" at a position where a row having "OBJECT: source" and a column having the offset "3" cross. The index generating unit 150b sets a flag "1" at a position where a row having "OBJECT: target" and a column having the offset "1" cross.

In the result 48, an arc <PAST> is connected to the node 61. The node 61 corresponds to the morpheme "give" at the offset "3" Therefore, the semantic attribute giving unit 150c sets a flag "1" at a position where a row having "PAST: source" and a column having the offset "3" cross.

Processing will be described that sets a flag at rows of span attributes in the index 48a by the semantic attribute giving unit 150c. The distance (span) between the morphemes "give" and "banana" in the character string corresponding to the nodes 61 and 64 connected by the arc <OBJECT> is "2". Therefore, the index generating unit 150b sets a flag "1" at positions where a row having span2 and columns having the offsets "1" and "3" cross. Description regarding other processes that set flags at rows having span attributes by the index generating unit 150b will be omitted.

The retrieving unit 150d in the retrieval apparatus 100 executes an AND operation on the index (index bit map) 46a generated by the index generating unit 150b and the index (query bit map) 48a generated by the semantic attribute giving unit 150c. The retrieving unit 150d sequentially executes a process that extracts an independent word part, a process that performs conversions for operations, and an AND operation. Though not illustrated, a result of an AND operation on the index 46a and the index 48a has "0" at arc attributes. Therefore, the retrieving unit 150d determines that the text data piece "John gave bananas to Mary." does not hit to the query and excludes it from text data pieces to be retrieved.

The retrieving unit 150d executes an AND operation on the index (index bit map) 47a generated by the index generating unit 150b and the index (query bit map) 48a generated by the semantic attribute giving unit 150c. The retrieving unit 150d sequentially executes a process that extracts an independent word part, a process that performs conversions for operations, and an AND operation. Though not illustrated, a result of the AND operation on the index 47a and the index 48a has "1" at the corresponding parts of the arc attributes. Therefore, the retrieving unit 150d determines that the text data piece "Mary gave bananas to John." hits to the query and extracts it as a text data piece to be retrieved.

The retrieval apparatus 100 according to this embodiment may perform a retrieval considering semantic attributes by one pass without excessively increasing the size of the index even when target character strings are English.

Other processes by the retrieval apparatus 100 will be described. Having described that the retrieval apparatus 100 illustrated in FIG. 1 has the index generating unit 150b that generates the index table 140c, embodiments are not limited thereto.

For example, a server connected to the retrieval apparatus 100 over a network may have the function of the index generating unit 150b and may generate the index table 140c. The obtaining unit 150a in the retrieval apparatus 100 receives the index table 140c generated by the server and stores the received index table 140c in the storage unit 140.

The retrieval apparatus 100 receives the index table 140c from the server for use as described above so that the processing load for the generation of the index table 140c may be reduced.

Figure 29:
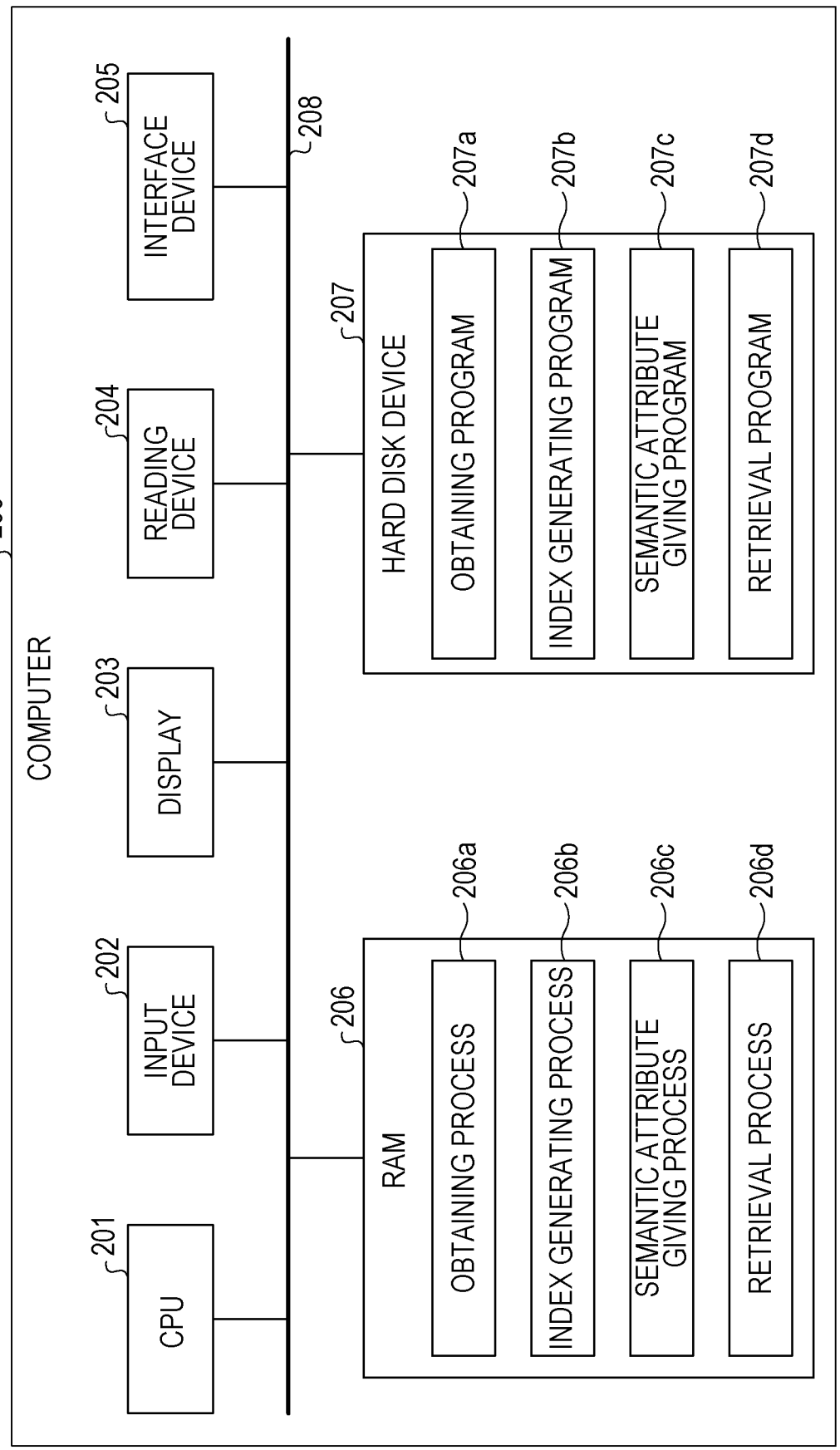
FIG. 29 is a diagram illustrating an example of a hardware configuration of a computer that implements the same functionality as that of the retrieval apparatus.

Next, an example of a hardware configuration of a computer that implements the same functionality as that of the retrieval apparatus 100 according to the aforementioned embodiment will be described. FIG. 29 is a diagram illustrating an example of a hardware configuration of a computer that implements the same functionality as that of the retrieval apparatus.

As illustrated in FIG. 29, the computer 200 includes a CPU 201 that executes computing processes, an input device 202 that receives data input by a user, and a display 203. The computer 200 further includes a reading device 204 that reads a program, for example, from a storage medium and an interface device 205 that exchanges data with another apparatus over a wired or wireless network. The computer 200 further includes a RAM 206 that temporarily stores information and a hard disk device 207. The devices 201 to 207 are connected to a bus 208.

The hard disk device 207 has an obtaining program 207a, an index generating program 207b, a semantic attribute giving program 207c, and a retrieval program 207d. The hard disk device 207 reads the programs 207a to 207d and decompresses them in the RAM 206.

The obtaining program 207a functions as an obtaining process 206a. The index generating program 207b functions as an index generating process 206b. The semantic attribute giving program 207c functions as a semantic attribute giving process 206c. The retrieval program 207d functions as a retrieval process 207c.

Processing of the obtaining process 206a corresponds to the processing by the obtaining unit 150a. Processing of the index generating process 206b corresponds to the processing by the index generating unit 150b. Processing of the semantic attribute giving process 206c corresponds to the processing by the semantic attribute giving unit 150c. Processing of the retrieval process 206d corresponds to the processing by the retrieving unit 150d.

The programs 207a to 207d may not originally be stored in the hard disk device 207. For example, the programs are stored in a portable physical medium such as a flexible disk (FD), a CD-ROM, a DVD, a magneto-optical disk, or an IC card to be inserted to the computer 200. The computer 200 may then read out and execute the programs 207a to 207d.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method performed by a processor included in a retrieval apparatus, the method comprising:
   generating an index using a syntactic analysis and semantic analysis, the index including positions of morphemes included in a target text data and semantic attributes between the morphemes corresponding to the positions;
   giving information including first positions of first morphemes included in an input query and semantic attributes between the first morphemes corresponding to the first positions to the query; and
   executing a retrieval on the target text data based on the information given to the query and the index from a storage device, wherein
   the generating the index identifies, as an expression analogous to a composite word, a group of morphemes corresponding to three or fewer nodes of nodes directly connecting to a node of a morpheme of a composite word in a syntactic tree and a semantic structure acquired as a result of the syntactic analysis and the semantic analysis thereon.

2. The method of claim 1, further comprising obtaining the index, wherein the executing a retrieval executes a retrieval on the target text data based on the obtained index and the information given to the query.

3. The method of claim 1, wherein the semantic attributes between the morphemes are information indicating a morpheme being a starting point of a dependency between the morphemes and a morpheme being an end point of the dependency.

4. The method of claim 1, wherein the target text data is a character string including two or more words having semantic attributes.

5. The method of claim 1, wherein the executing a retrieval is based on whether or not a morpheme being a starting point of a dependency between morphemes and a morpheme being an end point of the dependency in the information given to the query agree with a morpheme being a starting point of a dependency between morphemes and a morpheme being an end point of the dependency in the index.

6. A non-transitory, computer-readable recording medium having stored therein a program for causing a computer included in a retrieval apparatus to execute a process comprising:
   generating an index using a syntactic analysis and semantic analysis, the index including first positions of first morphemes included in a target text data and semantic attributes between the morphemes corresponding to the first positions;
   giving information including positions of morphemes included in an input query and semantic attributes between the first morphemes corresponding to the positions to the query; and
   executing a retrieval on the target text data based on the information given to the query and the index, wherein
   the generating the index identifies, as an expression analogous to a composite word, a group of morphemes corresponding to three or fewer nodes of nodes directly connecting to a node of a morpheme of a composite word in a syntactic tree and a semantic structure acquired as a result of the syntactic analysis and the semantic analysis thereon.

7. The non-transitory, computer-readable recording medium of claim 6, the process further comprising obtaining the index, wherein the executing a retrieval executes a retrieval on the target text data based on the obtained index and the information given to the query.

8. The non-transitory, computer-readable recording medium of claim 6, wherein the semantic attributes between the morphemes are information indicating a morpheme being a starting point of a dependency between the morphemes and a morpheme being an end point of the dependency.

9. The non-transitory, computer-readable recording medium of claim 6, wherein the target text data piece is a character string including two or more words having semantic attributes.

10. The non-transitory, computer-readable recording medium of claim 6, wherein the executing a retrieval is based on whether or not a morpheme being a starting point of a dependency between morphemes and a morpheme being an end point of the dependency in the information given to the query agree with a morpheme being a starting point of a dependency between morphemes and a morpheme being an end point of the dependency in the index.

11. A retrieval apparatus comprising:
   a memory; and
   a processor coupled to the memory and configured to:
      generate an index using a syntactic analysis and semantic analysis, the index including positions of morphemes included in a target text data and semantic attributes between the morphemes corresponding to the positions,
      give information including first positions of first morphemes included in an input query and semantic attributes between the first morphemes corresponding to the first positions to the query, and
   execute a retrieval on the target text data based on the information given to the query and the index, wherein
      the generated index identifies, as an expression analogous to a composite word, a group of morphemes corresponding to three or fewer nodes of nodes directly connecting to a node of a morpheme of a composite word in a syntactic tree and a semantic structure acquired as a result of the syntactic analysis and the semantic analysis thereon.

12. The retrieval apparatus of claim 11, wherein:
   the processor is further configured to obtain the index; and
   the processor execute a retrieval on the target text data based on the obtained index and the information given to the query.

13. The retrieval apparatus of claim 11, wherein the semantic attributes between the morphemes are information indicating a morpheme being a starting point of a dependency between the morphemes and a morpheme being an end point of the dependency.

14. The retrieval apparatus of claim 11, wherein the target text data is a character string including two or more words having semantic attributes.

15. The retrieval apparatus of claim 11, wherein
   the processor executes a retrieval, based on whether or not a morpheme being a starting point of a dependency between morphemes and a morpheme being an end point of the dependency in the information given to the query agree with a morpheme being a starting point of a dependency between morphemes and a morpheme being an end point of the dependency in the index.

* * * * *